United States Patent
Roy et al.

(10) Patent No.: US 11,540,173 B2
(45) Date of Patent: *Dec. 27, 2022

(54) EFFICIENT INROUTE (RETURN CHANNEL) LOAD BALANCING SCHEME OF GUARANTEED QOS TRAFFIC MIXED WITH BEST EFFORT TRAFFIC IN AN OVERSUBSCRIBED SATELLITE NETWORK

(71) Applicant: HUGHES NETWORK SYSTEMS, LLC, Germantown, MD (US)

(72) Inventors: Satyajit Roy, Gaithersburg, MD (US); Archana Gharpuray, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/074,462

(22) Filed: Oct. 19, 2020

(65) Prior Publication Data
US 2021/0037419 A1 Feb. 4, 2021

Related U.S. Application Data

(63) Continuation of application No. 16/258,172, filed on Jan. 25, 2019, now Pat. No. 10,820,235.

(51) Int. Cl.
| | | |
|---|---|---|
| *H04W 28/08* | (2009.01) | |
| *H04W 28/10* | (2009.01) | |
| *H04W 28/24* | (2009.01) | |
| *H04W 28/02* | (2009.01) | |
| *H04W 84/06* | (2009.01) | |
| *H04W 24/02* | (2009.01) | |

(52) U.S. Cl.
CPC ..... *H04W 28/085* (2013.01); *H04W 28/0268* (2013.01); *H04W 28/10* (2013.01); *H04W 28/24* (2013.01); *H04W 24/02* (2013.01); *H04W 84/06* (2013.01)

(58) Field of Classification Search
CPC ........... H04W 28/085; H04W 28/0268; H04W 28/10; H04W 28/24; H04W 24/10; H04W 24/06; H04W 24/04; H04W 24/02; H04W 84/04; H04W 84/06
USPC .................................................. 370/229–235
See application file for complete search history.

(56) References Cited

U.S. PATENT DOCUMENTS

| | | | | |
|---|---|---|---|---|
| 2005/0070320 A1* | 3/2005 | Dent | ................... | H04W 72/005 455/516 |
| 2013/0286833 A1* | 10/2013 | Torres | ................... | H04W 76/18 370/235 |
| 2016/0072691 A1* | 3/2016 | Xu | ..................... | H04B 7/18578 370/252 |

* cited by examiner

*Primary Examiner* — Candal Elpenord
(74) *Attorney, Agent, or Firm* — Potomac Technology Law, LLC

(57) ABSTRACT

A method for balancing inroute traffic load that contains both guaranteed QoS and best effort traffic. Hierarchical grouping levels are defined with the lowest level corresponding to inroutes within the system. Certain levels have common symbol rates, modulation rates, or both. When a new terminal requires admission, it is assigned to entries in the different hierarchical levels so that the inroute traffic load across all levels are balanced. Terminals are admitted to inroutes based, in part, on their channel quality indicator. Inroute traffic load can periodically rebalance based on elapsed time or terminal redistribution.

17 Claims, 19 Drawing Sheets

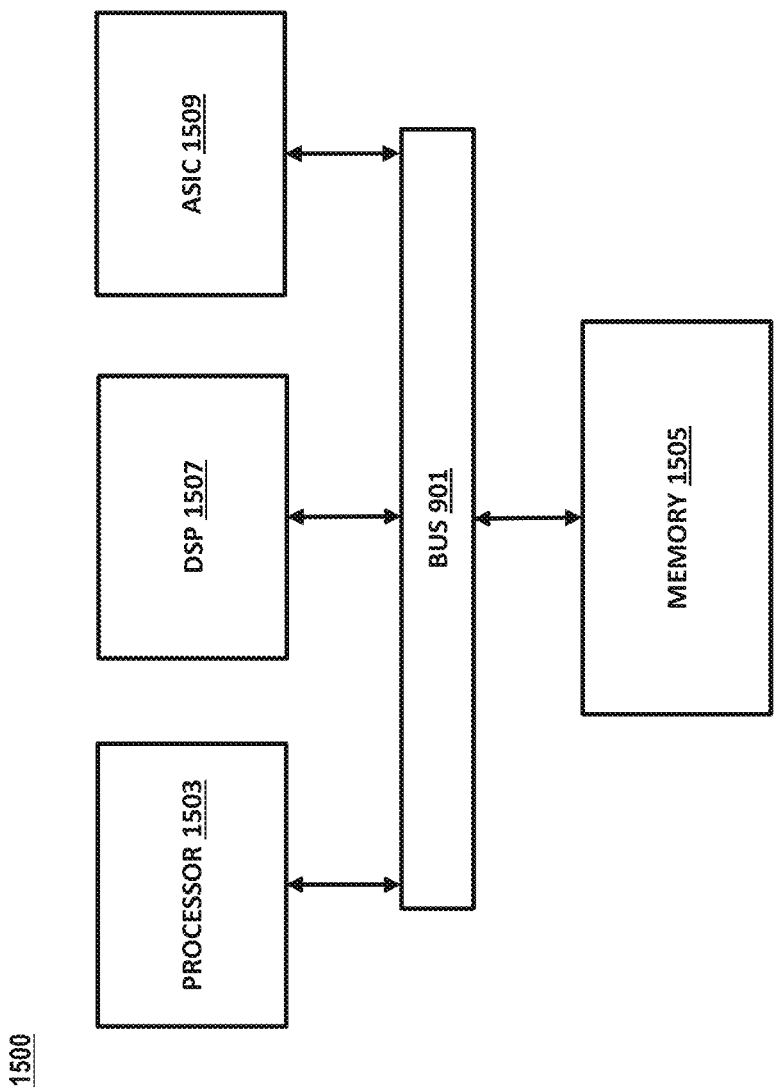

US 11,540,173 B2

EFFICIENT INROUTE (RETURN CHANNEL) LOAD BALANCING SCHEME OF GUARANTEED QOS TRAFFIC MIXED WITH BEST EFFORT TRAFFIC IN AN OVERSUBSCRIBED SATELLITE NETWORK

CROSS-REFERENCE TO RELATED APPLICATION

The present application is a Continuation of U.S. application Ser. No. 16/258,172 filed Jan. 25, 2019, the entire disclosure of which is incorporated herein by reference.

BACKGROUND INFORMATION

Modern communication systems allow consumers to maintain connectivity, regardless of their location. Many consumers are capable of utilizing different types of terminals (e.g., mobile phones, satellite phones, etc.) while traveling or moving through different geographic locations. Satellite communication systems are at least one type of communication system which facilitate such mobility to consumers. As the number of consumers and desired content increases, it also becomes necessary to monitor system status in order to maintain appropriate quality of service.

Communication systems, such as satellite communication systems, are extremely complicated and incorporate a large number of subsystems which must be properly integrated for proper functionality. Such systems can include multiple beams and multiple terminals operating within the beams. The system often carries different types of traffic with different priority levels, or quality of service (QoS). Efficient QoS in a satellite network is a very important item due, in part, to subscription services that require certain guaranteed features. While the forward link (or outroute) of a high throughput satellite is typically very wide, the return link (or inroute) of satellite terminals is comparatively narrow. For example, the return link for terminals comprises multiple Time Division Multiple Access (TDMA) channels. These channels can be configured with various symbol rates and modulation rates. The system defines Inroute groups where each inroute group consists of a group of return link channels with similar symbol and modulation rates.

It can often be difficult to monitor and optimize inroute traffic due to the narrow return link available. Further complications can arise due to the different types of traffic (e.g., best effort, guaranteed QoS, etc.) available on the inroutes. This can result, for example, in delays and load imbalance due to poor utilization of resources available within the system. Based on the foregoing, there is a need for an approach for balancing both best effort and guaranteed services in order to utilize the inroute resources at maximum efficiency.

BRIEF SUMMARY

A system and method are disclosed for balancing inroute traffic load that includes both guaranteed quality of service (QoS) traffic and best effort traffic. According to an embodiment, the method includes: selecting an inroute set for a new terminal from at least one inroute set carrying traffic load in a satellite communication system based, in part, on Inroute Set Definition Packets (ISDP) received from a remotely located inroute resource manager for the satellite communication system; selecting a super inroute group for the new terminal from at least one super inroute group contained in the selected inroute set, each of the at least one super inroute groups having a different symbol rate; selecting an inroute group for the new terminal from one or more inroute groups contained in the selected super inroute group, each of the one or more inroute groups having a different modulation rate; admitting the new terminal to a selected inroute from one or more inroutes contained in the selected inroute group based, at least in part, on a channel quality indicator (CQI) of the new terminal, each of the one or more inroutes having the same symbol rate and modulation rate; and transmitting and receiving data, by the new terminal, using the selected inroute, wherein inroute traffic load in the satellite communication system includes guaranteed service terminal traffic and/or backlog terminal traffic, and wherein the inroute traffic load in the satellite communication system is balanced across the at least one inroute set, the at least one super inroute group, the one or more inroute groups, and the one or more inroutes.

According to another embodiment, the system includes a satellite and a gateway for managing traffic from a plurality of terminals in a satellite communication system. The gateway includes an inroute resource manager configured to: select an inroute set for a new terminal from at least one inroute set carrying traffic load in a satellite communication system based, in part, on Inroute Set Definition Packets (ISDP); select a super inroute group for the new terminal from at least one super inroute group contained in the selected inroute set, each of the at least one super inroute group having a different symbol rate; select an inroute group for the new terminal from one or more inroute groups contained in the selected super inroute group, each of the one or more inroute groups having a different modulation rate; admit the new terminal to a selected inroute from one or more inroutes contained in the selected inroute group based, at least in part, on a channel quality indicator (CQI) of the new terminal, each of the one or more inroutes having the same symbol rate and modulation rate; and transmit and receiving data, by the new terminal, using the selected inroute, wherein inroute traffic load in the satellite communication system includes guaranteed service terminal traffic and/or backlog terminal traffic, and wherein the inroute traffic load in the satellite communication system is balanced across the at least one inroute set, the at least one super inroute group, the one or more inroute groups, and the one or more inroutes.

According to another embodiment, the method includes: selecting an inroute set carrying traffic load in a satellite communication system, based on a predetermined time interval; performing a super inroute group load balance between at least one super inroute group contained in the selected inroute set, each of the at least one super inroute groups having a different symbol rate; performing an inroute group load balance between one or more inroute groups contained in each of the at least one super inroute groups, each of the one or more inroute groups having a different modulation rate; and performing an inroute load balance between one or more inroutes contained in each of the one or more inroute groups, wherein the traffic load includes at least guaranteed service terminal traffic and/or backlog terminal traffic, and wherein traffic load for the satellite communication system is balanced across the at least one super inroute group, the one or more inroute groups, and the one or more inroutes.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 15 is a diagram of a chip set that can be used to implement various exemplary features and embodiments.

DETAILED DESCRIPTION

A method and system for balancing inroute traffic load in a satellite communication system is described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
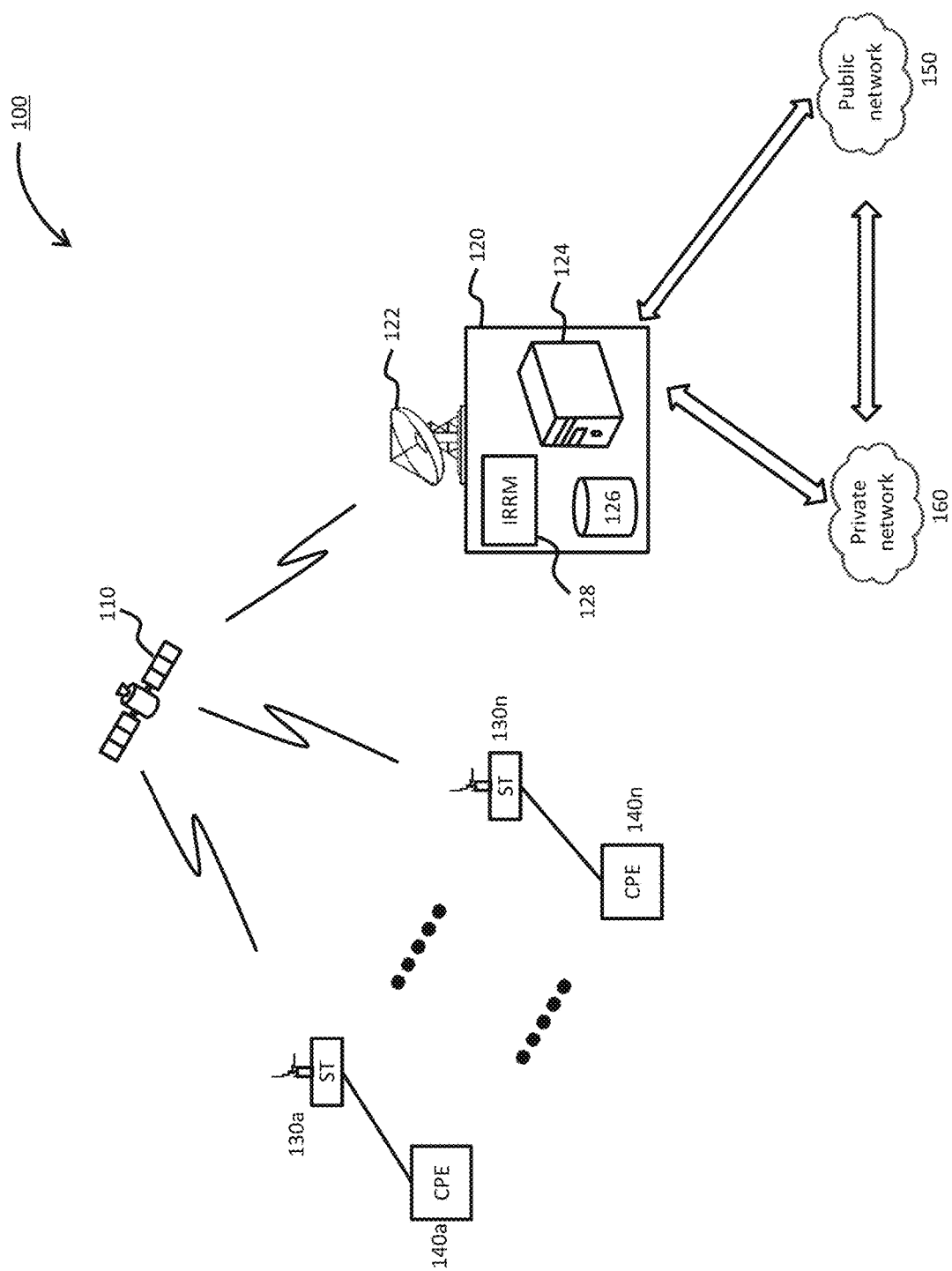
FIG. 1 is a diagram of a system capable of balancing inroute traffic, according to one embodiment.

FIG. 1 illustrates a satellite communication system 100 capable of balancing inroute traffic load, in accordance with various embodiments. The communication system 100 includes a satellite 110 that supports communications among a number of gateways 120 (only one shown) and multiple satellite terminals (STs) 130a-130n. Each satellite terminal (or terminal) 130 can be configured for relaying traffic between its customer premise equipment (CPEs) 140a-140n, a public network 150 such as the Internet, and/or its private network 160. Depending on the specific system configuration, the satellite terminals 130 can be in the form of very small aperture terminals (VSATs), medium fixed antenna systems, etc. The fixed terminals (e.g., VSAT, medium fixed antenna, etc.) can include an outdoor unit (i.e., transceiver, dish, antenna, etc.) for transmitting and receiving signals and an indoor unit such as a satellite modem. As illustrated in FIG. 1, the gateway 120 includes a transceiver 122 for transmitting/receiving information to/from the satellite 110.

According to at least one embodiment, the gateway 120 can include a processing unit 124 (or computer, CPU, etc.), a data storage unit 126, and an inroute resource manager 128. Alternatively, the gateway 120 can include multiple processing units 124, multiple data storage units 126, and multiple inroute resource managers 128 in order to accommodate the needs of a particular system implementation. The data storage units 126 can be used to store and provide various access to information pertaining, in part, to operations in the satellite communication system 100 and, in particular, information pertaining to traffic load on the inroutes of terminals 130 assigned to the gateway 120. According to one or more embodiments, the processing unit 124 can be configured to manage all operational aspects of the gateway 120.

According to various embodiments, the inroute resource manager 128 can be configured to manage some or all aspects of inroute load traffic from the terminals 130. For example, the inroute resource manager 128 can be configured to define various hierarchical levels for assigning inroute traffic from different terminals. The inroute resource manager 128 also manages assignment of terminals 130 to different inroutes based, in part, on balancing the inroute traffic from these terminals 130. The inroute resource manager 128 can, optionally, store information within the data storage unit 126 or within its own internal storage space. Therefore, the inroute resource manager 128 can be configured to implement all of the features required to balance inroute traffic load, admit terminals 130 to new inroutes (or various hierarchical levels), move terminals 130 to different inroutes (various hierarchical levels), and assign/allocate bandwidth to the terminals 130. As discussed in greater details below, the inroute resource manager 128 can be implemented using various hardware configurations. According to various embodiments, the processing unit 124 can be configured to perform some or all of the functions of the inroute resource manager 128. Accordingly, the processing unit 124 can be used in provide additional processing capability, when necessary. The processing unit 124 can also provide redundancy for the inroute resource manager 128 in the event of a failure.

As illustrated in FIG. 1, the satellite communication system 100 facilitates communication between a satellite network, public networks 150, and private networks 160. Various embodiments, however, can also be configured for providing communication within only a terrestrial network (e.g., public communication networks 150 and private communication networks 160), or within only a satellite network. Thus, while FIG. 1 only illustrates components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 100 illustrated in FIG. 1 is only intended to be illustrative, and in no way restrictive.

Figure 2:
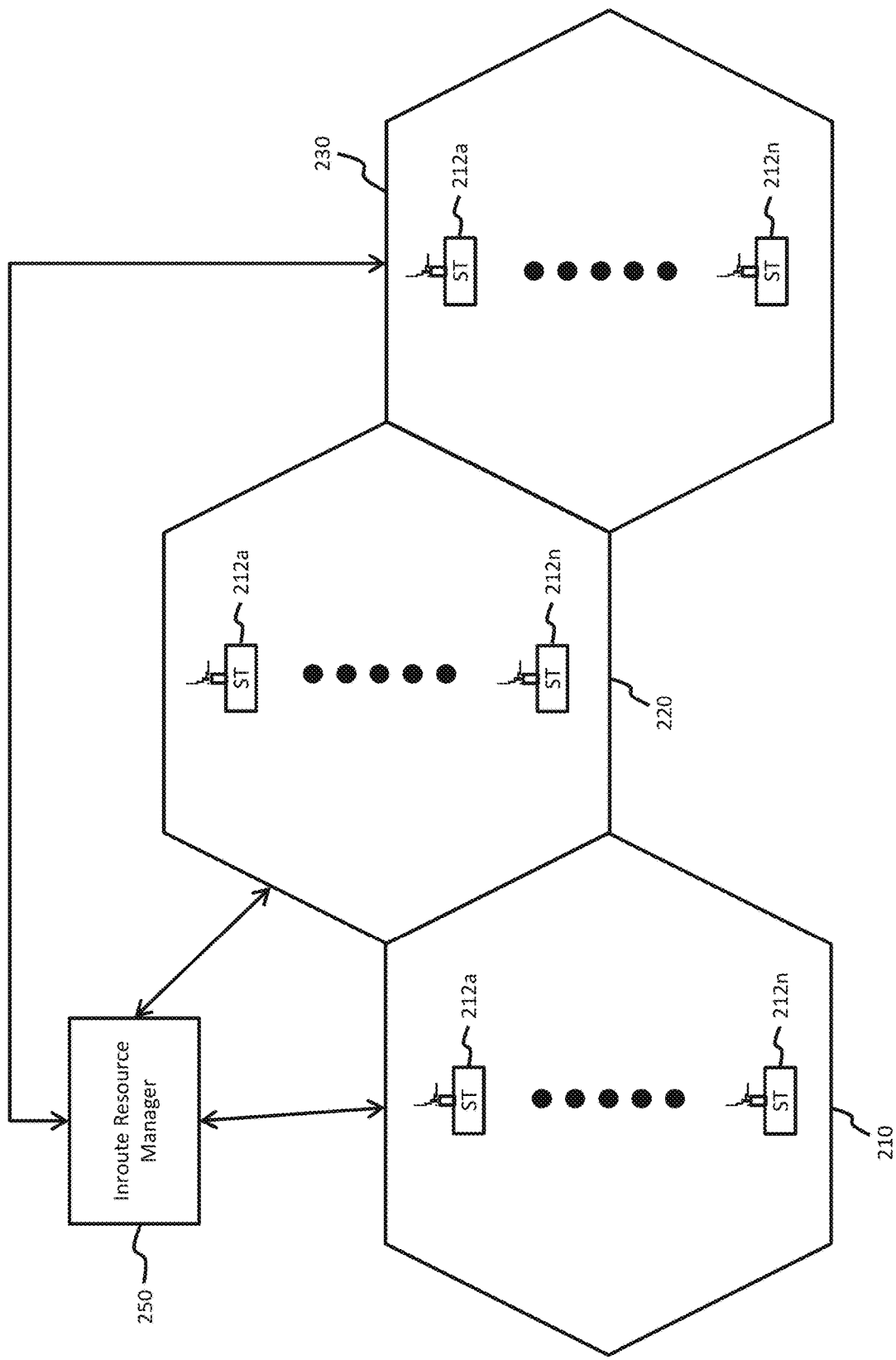
FIG. 2 is a diagram illustrating coverage beams and terminals used in the system of FIG. 1, according to one embodiment.

FIG. 2 is a diagram illustrating coverage beams and terminals used in the system of FIG. 1, according to one embodiment. Three individual coverage beams are illustrated. The first coverage beam 210 can provide service to a plurality of terminals 212a-212n (collectively 212). The second coverage beam 220 can provide service to a plurality of terminals 222a-222n (collectively 222). The third coverage beam 230 can provide service to a plurality of terminals 232a-232n (collectively 232). According to various embodiments, different hierarchical configurations can be implemented to achieve the desired level of inroute load balancing. For example, the first coverage beam 210 can be configured such that a single inroute set (discussed in greater detail below) is defined to accommodate all of the terminals 212 therein. Multiple inroutes sets can be defined to accommodate the terminals 222 operating within the second coverage beam 220. Additionally, the hierarchical sublevels within the inroutes sets can vary.

According to the illustrated embodiment, an inroute resource manager 250 performs all control aspects associated with the inroutes serviced by coverage beams in the system. The inroute resource manager 250 can manage any number of beams, for example, depending on the particular implementation. The inroute resource manager 250 can be configured to define the number of inroute sets within each coverage beam 210, 220, 230. The inroute resource manager 250 can be further configured to define and manage the sublevels within the inroute sets as well as bandwidth allocation to for terminals within all inroutes in the system.

Figure 3:
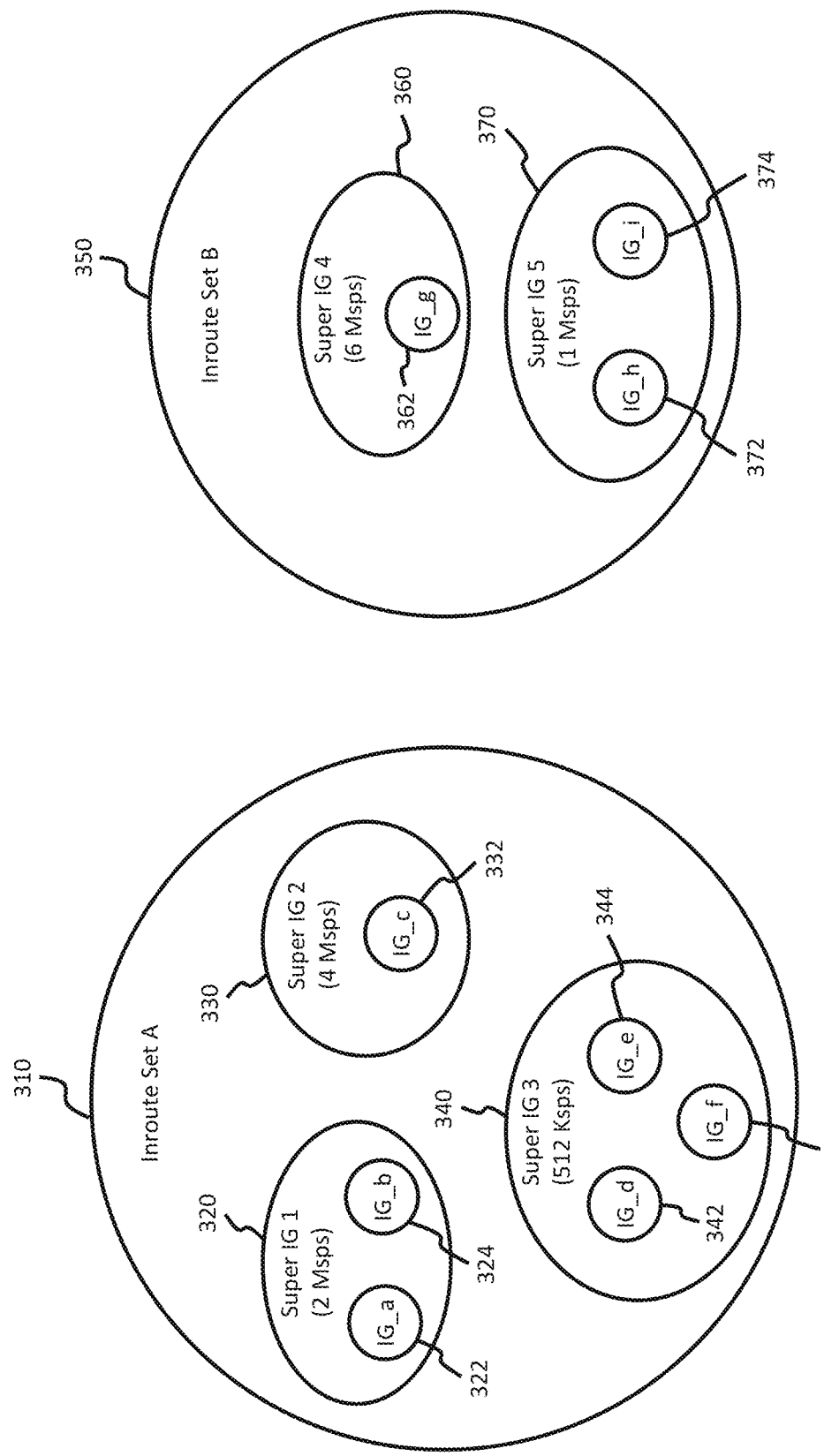
FIG. 3 is a diagram illustrating a hierarchical architecture for sorting inroutes, according to at least one embodiment.

FIG. 3 is a diagram illustrating a hierarchical architecture for sorting inroutes, according to at least one embodiment. Various levels are defined within a particular beam, for example, in order to classify active terminals and efficiently balance the inroute traffic from these terminals. At the highest level, one or more inroute sets can be defined. For example, FIG. 3 illustrates a first inroute set 310 (or inroute set A) and a second inroute set 350 (or inroute set B). Each inroute set 310, 350 consists of one or more super inroute groups (super_IG). Inroute set A 310, for example, contains a first super inroute group 320, a second super inroute group 330, and a third super inroute group 340. Inroute set B 350 contains a first super inroute group 360 and a second super inroute group 370.

Each super inroute group consists of one or more inroute groups (IG). For example, super inroute group 320 consists of a first inroute group 322 and a second inroute group 324. Super inroute group 330 consists of a single inroute group 332. Super inroute group 340 consists of a first inroute group 342, a second inroute group 344, and a third inroute group 346. Moving to second inroute set 350, super inroute group 360 contains a single inroute group 362. Super inroute group 370 contains a first inroute group 372 and a second inroute group 374.

According to various embodiments, each super inroute group consists of one or more inroute groups having the same symbol rate. For example, the inroute groups 322, 324 within super inroute group 320 utilize 2 Msps. The inroute group 332 within super inroute group 330 utilizes 4 Msps. The inroute groups 342, 344, 346 within super inroute group 340 utilize 512 Ksps. The inroute group 362 within super inroute group 360 utilizes 6 Msps, while the inroute groups 372, 374 within super inroute group 370 utilize 1 Msps. The inroute groups within a super inroute group, however, can have different modulation rates. For example, within super inroute group 320, the first inroute group 322 can utilize an 8 PSK modulation rate, while inroute group 324 can utilize a 16 APSK group. Furthermore, each inroute group consists of multiple time division multiple access (TDMA) inroute channels (i.e., return channels) having the same symbol and modulation rate.

The use of inroute sets provides an efficient utilization of the inroute resources in a typical deployment where fallback inroutes can be configured and enabled at a low symbol rate. Inroute sets facilitates system allocation of fallback inroutes at a lower symbol rate (or capacity) to terminals in clear sky conditions when those terminals are not producing huge backlogs or do not require large guaranteed bandwidth when that fallback bandwidth is not required to overcome rain attenuation of other terminals. Such features improve the efficiency with which inroute capacity is utilized and made available. Furthermore, service providers can be less concerned about the amount of bandwidth resource that must be allocated to configure at lower rates for weather mitigation within the network.

According to various embodiments, inroute load balancing is applied at different layers or levels, such as: across inroute sets, across super inroute groups within an inroute set, across inroute groups within a super inroute group, or across inroute channels within an inroute group. Depending on the specific implementation, inroute load balancing can be applied at a single layer, multiple layers, or all of the layers previously listed.

In addition to the different layers utilized for load balancing, different terminal categories can be defined with respect to their required quality of service (QoS). According to at least one embodiment, three categories of terminals can be defined as: adaptive constant bit rate (CBR), committed information rate (CIR), and traffic class based best effort (TCBE). ACBR and CIR terminals are referred to as guaranteed service terminals. TCBE terminals are referred to as best effort terminals or backlog terminals. Adaptive CBR (ACBR) Service plan provides a terminal with step sizes and percentages needed for allocating bandwidth adapting to the flow of traffic. With regards to bandwidth subscription, the ACBR terminal service plan can have the following characteristics:

1) Minimum Rate (kbps): a terminal with any traffic volume will receive at least this much bandwidth. If unused that bandwidth is available for other terminals.
2) Maximum Guaranteed Rate (kbps): a terminal can receive, at most, this much of bandwidth if available in the bandwidth pool. As previously discussed, a terminal may reach this maximum point through multiple steps depending on the traffic flow pattern and network oversubscription.

CIR terminal service plan provides percentages needed for allocating bandwidth while adapting to the follow of traffic. Unlike ACBR, however, no step size exists. With regards to bandwidth subscription, the CIR service can have the following characteristics:

1) Minimum Rate (kbps): a terminal with any traffic volume will receive at least this much bandwidth. If unused that bandwidth is available for other terminals.
2) Maximum Guaranteed Rate (kbps): a terminal with traffic volume exceeding a certain percentage (defined by a configuration) of the Minimum Rate will receive at least this much bandwidth, subject to bandwidth availability and network oversubscription. If not used, that bandwidth is available for other terminals.

3) Maximum Rate (kbps): a terminal may receive bandwidth above the Maximum Guaranteed Rate level, but will be capped at this maximum level.

TCBE terminal service plan allows for multiple traffic classes. According to an embodiment, multiple queues can be provided to support various traffic class QoS, such as interactive, streaming, and bulk. Despite the lack of guaranteed service requirements to the user, a minimum configured percentage of the available bandwidth can be pre-allocated to ensure that the bandwidth is not consumed entirely by other guaranteed classes. For example, a ratio between the different attribute classes (interactive, streaming, and bulk) can also be configured to avoid starvation on lower traffic classes. According to at least one embodiment, however, the pre-allocated bandwidth can be used by guaranteed service terminals when not in use. For example, if a portion of the pre-allocated bandwidth is unused due to low traffic demand from backlog terminals, the unused portion can be temporarily assigned to the guaranteed service terminals, as necessary. If the traffic load for backlog terminals increases, however, the unused portion can be reassigned to the pre-allocated bandwidth.

For each of the terminal service plans (ACBR, CIR and TCBE), on-demand streaming or real time service can be provided. To aid in exceptional treatment of real time traffic in terms of Latency and jitter, on-demand streaming uses reserved bandwidth on the return channel which supports admission control and 40 ms virtual framing. This type of session is called Admittance Controlled CBR (AC-CBR), which is part of the guaranteed service. Furthermore, these sessions are also load balanced, and terminals with AC-CBR sessions are not moved to balance the inroute traffic, unless various predetermined options have been exhausted.

Unlike balancing backlog based traffic from best effort terminals, the presence of guaranteed service terminals can create fragmentation of inroute resources if a proper load balancing technique is not used. With respect to committed bandwidth or guaranteed terminals, two opposite requirements would need to be satisfied. On one hand, the load of guaranteed bandwidth allocation would need to be balanced across super inroute groups, inroute groups within a super inroute group, and across individual TDMA channels within an inroute group. On the other hand, care must be taken to ensure that inroute resources are not fragmented. As discussed in greater detail with respect to FIG. 7, for example, merely utilizing a least loaded method to admit a guaranteed service terminal can cause unnecessary space fragmentation. After some elapsed time, it is often not possible to admit a new terminal to any inroute, even when total space left over all inroutes exceeds the required space for the new terminal.

Guaranteed service terminals are used to support a variety of end user applications that require a consistent allocation of inroute traffic to a terminal (e.g., cellular backhaul). As more traffic flows are allocated to a specific inroute, it becomes important to evenly distribute traffic flows within the inroute group in order to ensure that a particular traffic flow is not un-necessarily disadvantaged due to congestion.

According to at least one embodiment, the inroute load balancing can initiated by either terminals or the inroute resource manager at the gateway. Two contexts of load balancing can be observed at each level, namely initial load balancing and periodic load balancing. Initial load balancing refers to the case when a terminal is admitted to an inroute set, a super_IG, an inroute group, or an inroute. Periodic load balancing refers to the method of balancing load of already active terminals periodically across different levels.

Figure 4:
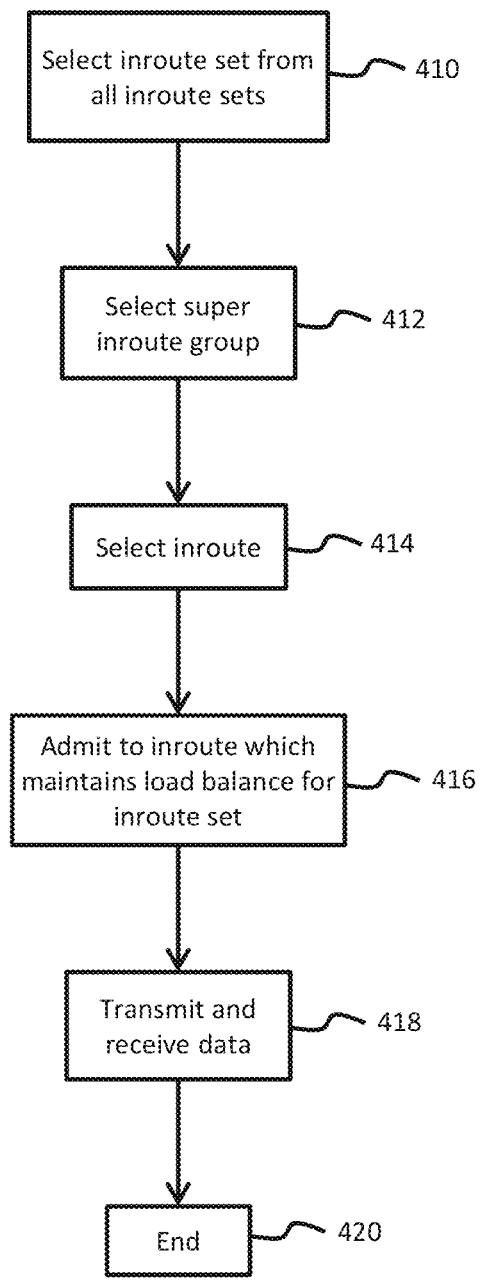
FIG. 4 is a flowchart of a process for inroute load balancing, according to one or more embodiments.

FIG. 4 is a flowchart illustrating the steps performed in balancing inroute traffic in accordance with at least one embodiment. At 410, an inroute set is selected from all of the inroute sets in the system. As previously discussed, the number of inroute sets within a particular coverage beam can vary. For example, a particular coverage beam may have 3 inroute sets defined within its coverage area, whereas an adjacent coverage beam can have 10 inroute sets defined therein. According to at least one embodiment, the inroute set is selected for the new terminal based, at least in part, on inroute set definition packets (ISDP) received from the inroute resource manager. The inroute resource manager can be located, for example, at a gateway which facilitates communication between terminals and the satellite.

At 412, a super inroute group is selected for the new terminal. The particular super inroute group can be selected based on the number of super inroute groups contained within the selected inroute set. If the selected inroute set only contains a single super inroute group, for example, then the new terminal is automatically assigned to this super inroute group. If the selected inroute set contains multiple super inroute groups, then the most appropriate super inroute group would be selected for the new terminal. According to at least one embodiment, selection of the super inroute group can be based on the symbol rate used to transmit signals. Thus, a super inroute group having a high symbol rate may be selected for terminals that require higher bandwidth and are capable of operating at the specified symbol rate.

At 414, an inroute group is selected for the new terminal from all of the inroute groups contained within the selected super inroute group. Accordingly, if the selected super inroute group only contains a single inroute group, the new terminal would automatically select this particular inroute group. According to at least one embodiment, the selection of an inroute group can be based on the particular modulation rate which is most appropriate for the new terminal. More particularly, each inroute group within the selected super inroute group utilizes a different modulation rate. The most appropriate modulation rate, therefore, can dictate selection of the inroute group. At 416, the terminal is admitted to an inroute, within the selected inroute group, which maintains or achieves a balanced load for the selected inroute set. More particularly, the new terminal is admitted to a particular inroute which maintains load balance across inroutes, inroute groups, and super inroute groups within the selected inroute set. According to at least one embodiment, admission of the new terminal can be based, at least in part, on a channel quality indicator (CQI) associated with the new terminal. The channel quality indicator (CQI) can provide, in part, information regarding the terminal's transmit power headroom. The CQI can provide, for example, an indication of the communication quality in the current channel being used by the terminal. The CQI can also provide an indication of transmit parameters useable by the terminal to improve throughput while maintaining or improving communication quality. Furthermore, the inroutes and/or inroute groups can have specific CQI requirements. At 418, the new terminal initiates transmission and reception of data using the selected inroute. The process ends at 420.

Figure 5:
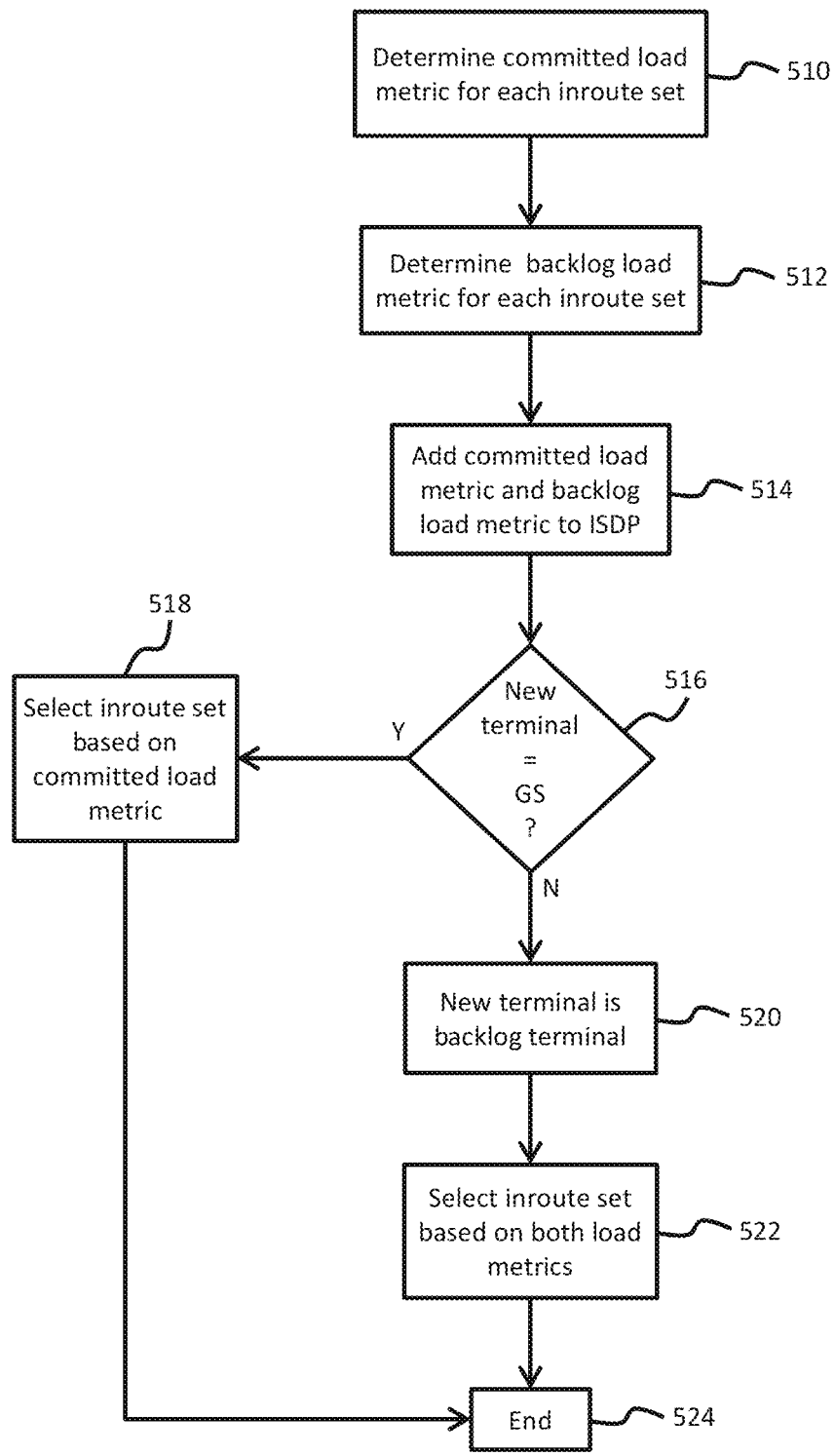
FIG. 5 is a flowchart of a process for admitting a new terminal to an inroute set, according to one embodiment.

FIG. 5 illustrates various steps performed in selecting an inroute set, in accordance with at least one embodiment. At 510, a committed load metric is determined for each inroute within the available inroute sets. The committed load metric can provide an indication of the amount of guaranteed bandwidth available for ACBR and CIR terminals across all the inroute groups of the selected inroute set. A higher value for the committed load metric, for example, can be indicative of lower load, whereas a lower value can be indicative of higher load. According to at least one embodiment, the committed load metric can be based on the aggregate current allocation (or load) from all the guaranteed service terminals and the aggregate guaranteed bandwidth subscription of all currently active guaranteed service terminals. At 512, a backlog load metric is determined for each inroute set. The backlog load metric can provide an indication of the amount of stream bandwidth available for backlog-driven traffic across all the inroute groups of the inroute set. Bandwidth currently allocated to terminals for their guaranteed subscription and admittance controlled traffic are excluded, or subtracted, from the total available bandwidth when calculating the backlog load metric.

At 514, the committed load metric and the backlog load metric are incorporated into the inroute set definition packets (ISDP) to be transmitted from the inroute resource manager. At 516, it is determined whether the new terminal is a guaranteed service terminal. More particularly, depending on the specific terminal being admitted, it may be necessary to allocate bandwidth differently. Terminals subscribing to a minimum and/or maximum guaranteed bandwidth allocation can be prioritized over terminals subscribing to a bandwidth allocation having a lower priority such as, for example, best effort. If the new terminal is determined to be a guaranteed service terminal, then the inroute set is selected based on the committed load metric at 518. If the new terminal is not a guaranteed service terminal, it is determined to be a backlog terminal at 520. The inroute set is selected, at 522, based on both load metrics. More particularly, if the new terminal is a backlog terminal, then both the committed load metric and the backlog load metric are utilized in determining which inroute set should be selected. The terminal applies a random weighted selection mechanism on the load metric (or load metrics) when selecting the optimal inroute set. More particularly, the committed load metric and backlog load metric can be weighted differently when selecting an inroute set. For example, the committed load metric can be assigned a weight ranging from 0.6-0.9, while the backlog load metric can be assigned a weight ranging from 0.1-0.4. The two weights are selected such that a sum of 1 is achieved both weights are combined. Thus, if the committed load metric is assigned a weight of 0.7, then a weight of 0.3 can be assigned to the backlog load metric. According to various embodiments, the ISDPs can also provide preference information for the inroute group type which the terminal uses to go active for the particular inroute set. If the link condition does not allow use of the most preferred inroute group type, the terminal picks an inroute group from a next most preferred inroute group type. The process ends at 524.

Load Balancing Across Inroute Sets

Due to dynamic nature of traffic which varies over the period of a day, week, and also has seasonal variation, it is not always possible to use a static oversubscription ratio. Therefore, an oversubscription factor can be dynamically determined using an exponential moving average (for smoothing) of the current or instantaneous oversubscription factor samples. If all the guaranteed service terminals currently active can receive up to their guaranteed subscription, then the current or instantaneous oversubscription factor is one (no oversubscription). On the other hand, if one or more terminals cannot get their guaranteed bandwidth, then oversubscription occurs. According to at least one embodiment, the system separately calculates the oversubscription factor over an entire inroute set, super_IG, and inroute group.

The dynamically calculated oversubscription factor is considered for the calculation of committed load metric. If an inroute set is more oversubscribed than the other, the committed load metric becomes smaller and so, this inroute set is less preferred by a terminal. If only the current allocation of guaranteed service terminals is considered, then it would not provide the clear picture of the oversubscription factor. This is because a terminal with larger guaranteed bandwidth subscription has the higher probability of using more bandwidth in the near future. The guaranteed bandwidth subscription values of ACBR and CIR terminals are also considered in the calculation of the committed load metric.

As previously discussed, a higher metric value indicates less load and accordingly, a terminal uses this metric to select its inroute set. The committed load metric has two components—i) the aggregate current allocation or load from all the guaranteed service terminals, and ii) the aggregate guaranteed bandwidth subscription of all currently active guaranteed service terminals. Between these two factors (actual load and guaranteed subscription), weights can be assigned to give a comparative preference to one over the other in the calculation of committed load metric. Furthermore, the oversubscription factor is included.

It could be possible that two inroute sets have the same allocation density of guaranteed bandwidth. Although they are the same, terminals which are active on the second inroute set could contribute more towards the aggregate guaranteed subscription, meaning that these terminals did not grow much to fully utilize their subscription. In this particular case, the second inroute set can provide a smaller load metric which indicates that they are less preferred for selection by a terminal. This helps in the situation when terminals grow in the near future and do not need to be moved around for load balancing. When the load on the first inroute set increases, the load metric value decreases ends at a certain point it goes smaller than the second set. Then terminals start selecting the second set.

The backlog load metric can be determined by calculating the backlog density of each inroute set or super_IG or IG. The backlog here refers to the backlog advertised by the terminals minus the allocation already provided in the previous round trip time. The density is considered because the size of all inroute sets are not the same in terms of symbol and modulation rates, and the number of TDMA channels. Similarly, the committed load metric is a normalized, or density, value which accounts for different sizes of inroute sets or groups. According to various embodiments, inroute set load balancing occurs only when a terminal comes active into the network.

When inroute set use is enabled in a resource pool, the backlog load metric (BLM) is used to select an inroute set. The inroute set backlog load metric is set equal to the current backlog density (converted into a 16-bit integer and inverted such that higher metrics represent less load) of the inroute set as a whole.

$$BLM=65535-(IS\ BL\ Density*BLshift)$$

The IS BL Density is the ratio of the amount of aggregate backlog bytes and the available bandwidth in symbol rate for carrying backlog-based traffic in an inroute set. The backlog density version of the metrics is calculated after subtracting off the reserved and guaranteed bandwidth.

BLshift is the configurable value (with a default of 10000). There is no need for a per inroute type inroute set backlog load metric. The advertised backlog load metric (BLM-adv) actually sent in the ISDP is the maximum of the calculated backlog load metric and one (1).

$$BLM\text{-}adv = MAX(BLM, 1)$$

The committed load metric can be calculated using the following equation.

IS IGcapacity=total capacity of an inroute set expressed in number of slots

Blmin=the minimum amount of bandwidth (expressed as a percentage) which has been reserved for backlog use Blalloc=the percentage of total available bandwidth on an inroute set assigned to the backlog based terminals. This is calculated as ratio of total slots allocated to best effort terminals (CIR terminals best effort allocation not considered) to total capacity of an inroute set expressed in number slots.

AlohaBW=total number of slots reserved for ALOHA

AC-CBRcur,BE=Total Admittance Controlled CBR currently allocated over the entire inroute set for backlog based best effort terminals A-CBRmin=Total Adaptive CBR minimum bandwidth allocated over the entire inroute set CIRmin=Total CIR minimum bandwidth allocated over the entire inroute set A-CBRcur=Total Adaptive CBR guaranteed bandwidth currently allocated (beyond the minimum) over the entire inroute set CIRcur=Total CIR guaranteed bandwidth currently allocated (beyond the minimum) over the entire inroute set Rangingcur=Total ranging bandwidth currently allocated over the entire inroute set OSF=instantaneous over subscription factor OSFsm=smoothened (exponential moving average) over subscription factor beta=this is a static factor which provides bias in considering the subscription. By default, the value of beta is 0.7.

CLM=Committed service load metric

TC=AC-CBRcur,BE+A-CBRmin+CIRmin+Rangingcur+(A-CBRcur+CIRcur); this is calculated over the entire inroute set, note that AC-CBR for only BE terminals are considered because A-CBRcur and CIRcur already include CBR sessions TA=(IS IGcapacity−AlohaBW)*(1−(MIN (Blmin, Blalloc))/100); this is calculated over the entire inroute set The oversubscription factor is first calculated. If all the hard QoS terminals currently active can receive up to their guaranteed subscription, then the current or instantaneous oversubscription factor is zero (no oversubscription). On the other hand, if one or multiple terminals cannot get their guaranteed bandwidth, then oversubscription scenario occurs. The system calculates separately the oversubscription factor over an entire inroute set, super_IG, and inroute group. The method is similar with the exception that the evaluation scope is different. For the calculation of oversubscription factor over an inroute set:

Determine currently active ACBR, CIR terminals on the inroute set for which OSF is being calculated Determine the guaranteed subscription of each of the above ACBR and CIR terminals by converting the throughput in number of bytes calculated over one superframe time. Then normalize it to number of slots based on the current modulation and code rate used by the terminals Sum guaranteed bandwidth subscription over all the active hard QoS terminals in slots, represented as SUBgw The instantaneous OSF is then calculated as:

$$OSF_{gw}(t) = \max(0, (1-TA/SUB_{gw}))$$

For example if 40 slots are available capacity while total guaranteed subscription is 50 slots, then (1−40/50)=0.2 is the oversubscription or 20% oversubscription. When TA=40 slots and total guaranteed subscription is 80 slots, then (1−40/80)=0.5 is the oversubscription or 50% oversubscription.

Smoothened average is determined as $OSFsm(t) = alpha*OSFgw(t) + (1-alpha)*OSFsm(t-1)$, the default value of alpha=0.05, but can be tuned during development and testing.

A static oversubscription factor is configured at a system level. Let's call it Fosf. The variable TA is artificially inflated based on this factor, where TAinfl=TA*(1+Fosf).

$$OSFsm(t) = \max(OSFsm(t), Fosf)$$

The current allocation, TC is artificially inflated by the dynamically calculated oversubscription factor, TCinfl=TC*(1+OSFsm(t))

The following formula represents calculation of the Committed Bandwidth Load metric. A terminal selects an inroute set with higher load metric. The load metric calculation considers the following key metrics $$CLM = MAX(1, 65535*(1-(TCinfl/TAinfl)))$$

OSF can be used in the following manner. The factor (1+OSFsm) increases as OSF increases. So, TC/TA increases, thereby resulting in a decrease of the load metric and gets less preferred by a terminal.

A higher metric value indicates less load and accordingly, a hard QoS terminal uses this metric to select its inroute set.

Load Density Calculation

Two types load density are calculated: backlog load density and committed service load density. They can be calculated for an inroute set, a super_IG, an inroute group, or a particular inroute. The backlog density is defined as the ratio of amount of aggregate backlog and the available aggregate symbol rate. The unit of backlog density is bytes per symbol per second. The available amount of symbol rates excludes those assigned for AC-CBR, ACBR, CIR (up to guaranteed) and Aloha.

Let $A_k$ (in bytes) be the total amount of effective backlog, and $S_k$ the total amount of symbols per second for inroute group # k, k=1, ..., $K_i$, where $K_i$ is the number of inroute groups in a super_IG i. Inroute group # k can be characterized by symbol rate 512 ksps, 1024 ksps, 2048 ksps, or 4096 ksps, etc. Thus, the total available symbol rate can be expressed as:

$S_k$=Sum of symbol rates in IG # k *(1−percentage of committed service).

The percentage of committed service is the portion of inroute resource allocated to AC-CBR sessions and guaranteed service ACBR and CIR hard QoS terminals at run-time. For example, for an IG with 10 1024 ksps inroutes, with 30% guaranteed service current usage, the amount of symbol rate would be 10*1024 ksps*(1-30%)=7168 ksps. The overhead symbols can be neglected for simplicity.

The effective backlog is the reported backlog (by terminals) minus the allocated bandwidth in the past round trip time. The effective backlog load can be denoted as BL (in bytes). Because active users (or terminals) with zero backlog could still consume a lot of periodic bandwidth, such bandwidth usage may be counted so that a skewed distribution on zero backlog users (or terminals) won't impact the performance of the load balancing. This backlog can be called periodic load (PL). To be conservative, PL is counted using allocated bandwidth for 4 frames. Slots are converted to bytes using the actual code rate. So, for a particular inroute group, the effective backlog would be:

$$A_k = BL_k + b \cdot PL_k, k=1, \ldots, K_i.$$

Where b is the coefficient for Periodic load, taking either 0 or 1. The default value is b=1.

The backlog density for inroute group # k, denoted as $\rho_k$, can be expressed as:

$$\rho_k = \frac{A_k}{S_k}, k = 1, \ldots, K_i.$$

Where $K_i$ is the number of inroute groups in a super inroute group i.

Let $A_i^{Super\text{-}IG}$ and $S_i^{Super\text{-}IG}$ denote the total throughput and total symbol rates of the i-th super_IG, i=1, ..., N. N is the number of super_IGs. Let $K_i$ be the number of inroute groups in super_IG(i). Then we have $$A_i^{Super\text{-}IG} = \sum_{k=1}^{K_i} A_k, \quad S_i^{Super\text{-}IG} = \sum_{k=1}^{K_i} S_k.$$

Where $A_k$ is the effective total backlog (in bytes) of inroute group k, and $S_k$ is the effective symbol rate, excluding that portion assigned for guaranteed service and Aloha.

The mean density for the whole inroute set, $\rho_{mean}^{IG\text{-}Set}$, is given by $$\rho_{mean}^{IG\text{-}Set} = \frac{\sum_{i=1}^{N} A_i^{Super\text{-}IG}}{\sum_{i=1}^{N} S_i^{Super\text{-}IG}}.$$

In general, the purpose of load balancing should be bringing the load density of super_IG(i), $\rho_i^{Super\text{-}IG}$, close enough to $\rho_{mean}^{IG\text{-}Set}$ by switching terminals across super inroute groups.

The detailed logic and equation for calculating the committed service load density will now be described. Let $A_i^{Super\text{-}IG}$ and $S_i^{Super\text{-}IG}$ denote the total amount of aggregated effective committed service allocation and total symbol rates of the i-th super_IG, i=1, ..., N, where N is the number of super_IGs. Let $K_i$ be the number of inroute groups in super_IG(i). This results in:

$$A_i^{Super\text{-}IG} = \sum_{k=1}^{K_i} A_k, \quad S_i^{Super\text{-}IG} = \sum_{k=1}^{K_i} S_k.$$

Where $A_k$ is the total amount of effective committed service allocation (in bytes) in inroute group k, and $S_k$ is the effective symbol rate=Sum of symbol rates in IG # k [excludes ALOHA]*(1−percentage (MIN (Blmin, Blalloc)).

The backlog density for inroute group # k, denoted as $\rho_k$, can be expressed as $$\rho_k = \frac{A_k}{S_k}, k = 1, \ldots, K_i.$$

The oversubscription and growth probability factors are included in the calculation of the effective committed server aggregated allocation, where $$A_k = CA_k * (OSFsm,k \, (t)) * (pgrowth,k)$$

Where:

$CA_{k=total\ amount\ of\ committed\ service\ allocation\ in\ inroute\ group\ k}$ OSFsm,k is the smoothened oversubscription factor calculated for inroute group k pgrowth,k is the aggregate probability of growth of all hard QoS terminals in inroute group k expressed in percentage Note that $A_k$ increases as an inroute group is more oversubscribed, thus causing the load density to also increase and making the inroute group less preferable for the selection. The growth factor is influenced by how much bandwidth is remaining for each hard QoS terminal to grow up to its guaranteed bandwidth.

Let $RG_{n,k}$ be the possible growth amount (meaning how much more it can grow towards its guaranteed subscription) of a hard QoS terminal n in inroute group k. The aggregate possible growth in inroute group k can be expressed as:

$$RG_k = \sum_{n=1}^{N_k} RG_{n,k}$$

where $N_k$ is the number of hard QoS terminals in inroute group k.

The aggregated guaranteed bandwidth subscription over all hard QoS terminals in inroute group k can be expressed as:

$$CS_k = \sum_{n=1}^{N_k} CS_{n,k}$$

where $N_k$ is the number of hard QoS terminals in inroute group k and $CS_{n,k}$ is the guaranteed bandwidth subscription of nth hard QoS terminal in inroute group k.

Then, pgrowth, $$k = \frac{RG_k}{CS_k}$$

The committed service load density of $$\text{super\_IG}(i) = \rho_i^{Super\text{-}IG} = \frac{A_i^{Super\text{-}IG}}{S_i^{Super\text{-}IG}}$$

The mean committed service load density for the whole inroute set, $\rho_{mean}^{IG\text{-}Set}$, is given by $$\rho_{mean}^{IG\text{-}Set} = \frac{\sum_{i=1}^{N} A_i^{Super\text{-}IG}}{\sum_{i=1}^{N} S_i^{Super\text{-}IG}}.$$

In general, the purpose of committed service load balancing should be bringing the committed service load density of super_IG(i), $\rho_i^{Super\text{-}IG}$, close enough to $\rho_{mean}^{IG\text{-}Set}$ by switching terminals across super inroute groups.

Load balancing across super inroute groups

After selecting the inroute set, a terminal selects an inroute group within the inroute set for sending its initial ALOHA burst. The inroute group selection is driven by the terminal's current link condition and according to the "go active preference" advertised by in the ISDP message. According to various embodiments, a terminal's initial inroute group selection may be overridden by the inroute resource manager at the time of initial access by selecting an optimal super inroute group. This process is called the initial load balancing across super inroute groups.

An inroute set consists of one or more super inroute groups. A super inroute group is formed by collecting all the inroute groups of the same symbol rate, but the modulation rates can be different. Based on the channel quality indicator (CQI) and backlog of terminals, a best effort (or backlog) terminal is assigned to the appropriate super inroute group. CQI is calculated based on the power headroom information conveyed from the terminal. This ensures that when most of the terminals link condition is very good, every terminal will not flock to the higher symbol rate super inroute group. Terminals with smaller backlogs are assigned to the lower symbol rate super inroute group although the CQI of these terminals make them eligible to use a higher symbol rate.

A committed service load density (also interchangeably referred to as committed load metric or committed bandwidth load density) is calculated for each super_IG in the system for the initial load balancing of guaranteed service terminals across super_IGs. The committed service load density is defined as the ratio of amount of aggregate effective guaranteed bandwidth allocation and the available aggregate symbol rate. The available amount of symbol rate excludes those assigned for Aloha and to another item which is the minimum of two quantities: reserved backlog based bandwidth and currently allocated bandwidth to best effort terminals. According to various embodiments, the system reserves a certain percentage of bandwidth for the best effort service. When the demand is present from the best effort (or backlog) terminals this reserved bandwidth is always allocated to the backlog terminals ahead of guaranteed service terminals. If demand is not present, this bandwidth is not wasted, but allocated to other terminals. The aggregate allocation consists of ACBR and CIR terminals allocation, and admittance CBR allocation to traffic class based BE terminals. The estimated oversubscription and the probability of growth of ACBR and CIR terminals are also considered in the calculation of the effective guaranteed service allocation. The inroute super_IG which is currently more oversubscribed should be less preferable, and even less preferable when the probability of terminals growth is high on a super_IG. The growth factor is influenced by the ratio of actual allocation to guaranteed bandwidth subscription.

In addition to initial load balancing across super inroute groups, a periodic load balancing mechanism is in place to balance load between super inroute groups periodically. The traffic load is balanced in between inroute groups (IGs) with different symbol rates (i.e. across super inroute groups) and then balanced among inroute groups with the same symbol rate by dispatching and re-dispatching terminals. When only one inroute group is present per super inroute group, load balancing across super inroute groups results in load balancing across inroute groups. The periodic load balancing takes place continuously on a configured interval and executed separately for backlog based service and guaranteed service and the period ends do not align between them.

For backlog based terminals, the procedure applies two metrics, namely the channel quality indicator (CQI) of a terminal and the backlog density of a super inroute group. A mean density for the entire inroute set is calculated. The effective symbol rate, in the calculation, excludes slots that are assigned to AC-CBR, ACBR and CIR (up to guaranteed) sessions. The load density of each super_IG is calculated and the objective of this load balancing is to make each super_IG's load density as close as possible to the inroute set mean load density by shuffling terminals across super_IGs.

The procedure of periodic load balancing for guaranteed service terminals is like that of backlog based. Instead of backlog density, however, the committed bandwidth load density is applied. The balancing starts from the group with lower symbol rate, and terminals are switched between two neighboring super_IGs. This proceeds iteratively between neighboring two super_IGs until the highest symbol rate is reached. Provided that the terminals' CQIs are being met, each iteration would make the lower_IG reach its target backlog density or committed service density until all super_IGs achieve the respective targets.

When a terminal is moved from one super inroute group to another, the target super inroute group may have multiple inroute groups. Based on the committed load metric, the terminal is placed within an appropriate inroute group. Finally, the best inroute within that inroute group is assigned to the terminal. Within each super_IG, terminals are sorted in the descending order of their CQIs. When moving upward (e.g., from lower super_IG to higher super_IG), terminals from the top of the list are considered and moved, if they are eligible for the higher symbol rate CQI.

For backlog service balancing, the backlog volume threshold needs to be met. For the movement from higher to lower_IGs (symbol rates), terminals from bottom of the list are considered. The movement, lower to higher and higher to lower continues until the target density of the lower super_IG is achieved. To calculate the threshold backlog volume, mean and standard deviation of average backlog terminals in the sort list are calculated. A terminal is only moved if its backlog volume is greater than equal to the backlog volume threshold. It is to be noted that if there is no absolute need, a best effort terminal with AC-CBR sessions is not moved.

According to one or more embodiments, a threshold of number of allowed moves for each guaranteed service terminal within a configurable interval can be defined in order to limit the size of the sort list when performing a guaranteed service load balance. This can be used to prevent very frequent movement of certain terminals. If a terminal has recently arrived and did not grow much, it is preferred that such a terminal not be moved. A minimum residency period can be set (e.g., in minutes, hours, etc.) in order to prevent such terminals from being moved after having recently arrived. These two factors can be considered by not including guaranteed service terminals in the list, if such guaranteed service terminals have exceeded the threshold number of moves. Furthermore, terminals whose current utilization is less than a certain percentage of their guaranteed bandwidth subscription are placed at the bottom of the list. Also, terminals with AC-CBR sessions are put in the bottom of the list. Terminals whose demand is more but cannot be accommodated are not included in this category, because those terminals should be moved somewhere else so that they can grow. No more moves are performed if the targeted committed service density is reached. Terminals with AC-CBR session are not recommended to move if other options exist. If all options are exhausted, then these terminals are moved.

Super_IG Load balancing—Terminal dispatch with rebalancing

For backlog service:

When a super_IG is settled, terminals are moved out or into this super_IG. Backlog re-balancing is performed to restore the load balance among the inroute groups of a super_IG. The following criteria is applied:

If there are existing terminals that have been moved out, and no new terminals moved in, then no re-balancing is done.

If there are new terminals moved in from other super_IGs, then backlog re-balancing is performed to restore the load balance among the inroute groups regardless of whether or not existing terminals have been moved.

For load re-balancing:
(1). Settled list of a super_IG is determined, and newly moved-in terminals are remove from the list. These terminals are sorted by the backlog in descending order. Denote the sort list of new terminals as $L_{moved-in}$.
(2). The load density of each inroute group with residual terminals after settlement is calculated, as well as the mean density of the super_IG after settlement. The backlog density for inroute group # i, denoted as $\rho_i$, can be expressed as $$\rho_i = \frac{A_i^{residual}}{S_i}, i = 1, \ldots, K.$$

Where:
K is the number of inroute groups in the super_IG
$A_i^{residual}$ is the total backlog of inroute group # i counting the residual terminals after settlement
$S_i$ is total symbol rate (the summation of symbol rates of inroutes) in IG # i excluding the portion of guaranteed service.

The mean density for the whole super_IG after settlement, $\rho_{mean}^{settle}$, is given by $$\rho_{mean}^{settle} = \frac{A_{super-IG}}{\sum_{i=1}^{K} S_i}.$$

Where $A_{super-IG}$ is total backlog of the super_IG after settlement.

(3). Compare $\rho_i$, i=1, . . . , K, and $\rho_{mean}^{settle}$. For those $\rho_i < \rho_{mean}^{settle}$, calculate $\Delta D_i = (\rho_{mean}^{settle} - \rho_i) S_i$. Sort $\Delta D_i$ in descending order, forming an inroute group list to receive dispatched terminals.
(4). Dispatch terminals one by one in $L_{moved-in}$ from top-down to fill in the inroute group list in a Round Robin way until all terminals are dispatched. If a $\Delta D_i$ is satisfied during this process, then no more dispatched terminals will be assigned to IG # i. If all $\Delta D_i$ are satisfied and there are undispatched terminals in the list, then round robin process is applied to dispatch the leftover terminals to the IGs.

For committed service:
(1). Determine settled list of a super_IG and pull out the newly moved-in terminals. Sort these terminals in descending order by their committed bandwidth allocation or throughput. Denote the sort list of new terminals as $L_{moved-in}$. Note that terminals with AC-CBR sessions are kept at the bottom of the list.
(2). Calculate the committed service load density of each inroute group with residual terminals after settlement, and calculate the mean committed service density of the super_IG after settlement. The committed service density for inroute group # i, denoted as $\rho_i$, can be expressed as $$\rho_i = \frac{A_i^{residual}}{S_i}, i = 1, \ldots, K.$$

Where:
K is the number of inroute groups in the super_IG
$A_i^{residual}$ is the total amount of effective committed service allocation (in bytes) in inroute group i,
$S_i$=total symbol rate (the summation of symbol rates of inroutes) in IG # i [excludes ALOHA reservation]*(1− percentage (MIN (Blmin, Blalloc)).

The oversubscription and growth probability factors are included in the calculation of the effective committed server aggregated allocation, as follows:

$$A_i^{residual} = CA_i * (OSFsm, i(t)) * (pgrowth, i)$$

Where
$CA_i$=total amount of committed service allocation in inroute group i
OSFsm,i is the smoothened oversubscription factor calculated for inroute group i.
pgrowth,i is the aggregate probability of growth of all hard QoS terminals in inroute group i expressed in percentage.

The mean density for the whole super_IG after settlement, $\rho_{mean}^{settle}$, is given by $$\rho_{mean}^{settle} = \frac{A_{super-IG}}{\sum_{i=1}^{K} S_i}.$$

Where $A_{super-IG}$ is total effective committed service allocation of the super_IG after settlement.

(3). Compare $\rho_i$, i=1, . . . , K, and $\rho_{mean}^{settle}$. For those $\rho_i < \rho_{mean}^{settle}$, calculate $\Delta D_i = (\rho_{mean}^{settle} - \rho_i) S_i$. Sort $\Delta D_i$ in descending order, forming an inroute group list to receive dispatched terminals.
(4). Dispatch terminals one by one in $L_{moved-in}$ from top-down to fill in the inroute group list in a round robin fashion until all terminals are dispatched. During this process, if a $\Delta D_i$ is fulfilled, then no more dispatched terminals will be assigned to IG # i. If all $\Delta D_i$'s are fulfilled and there are undispatched terminals in the list, use round robin to dispatch the leftover terminals to the IGs.

Such balance restoring procedure is only operated when there are move-in terminals to a super_IG after settlement.

Figure 6A:
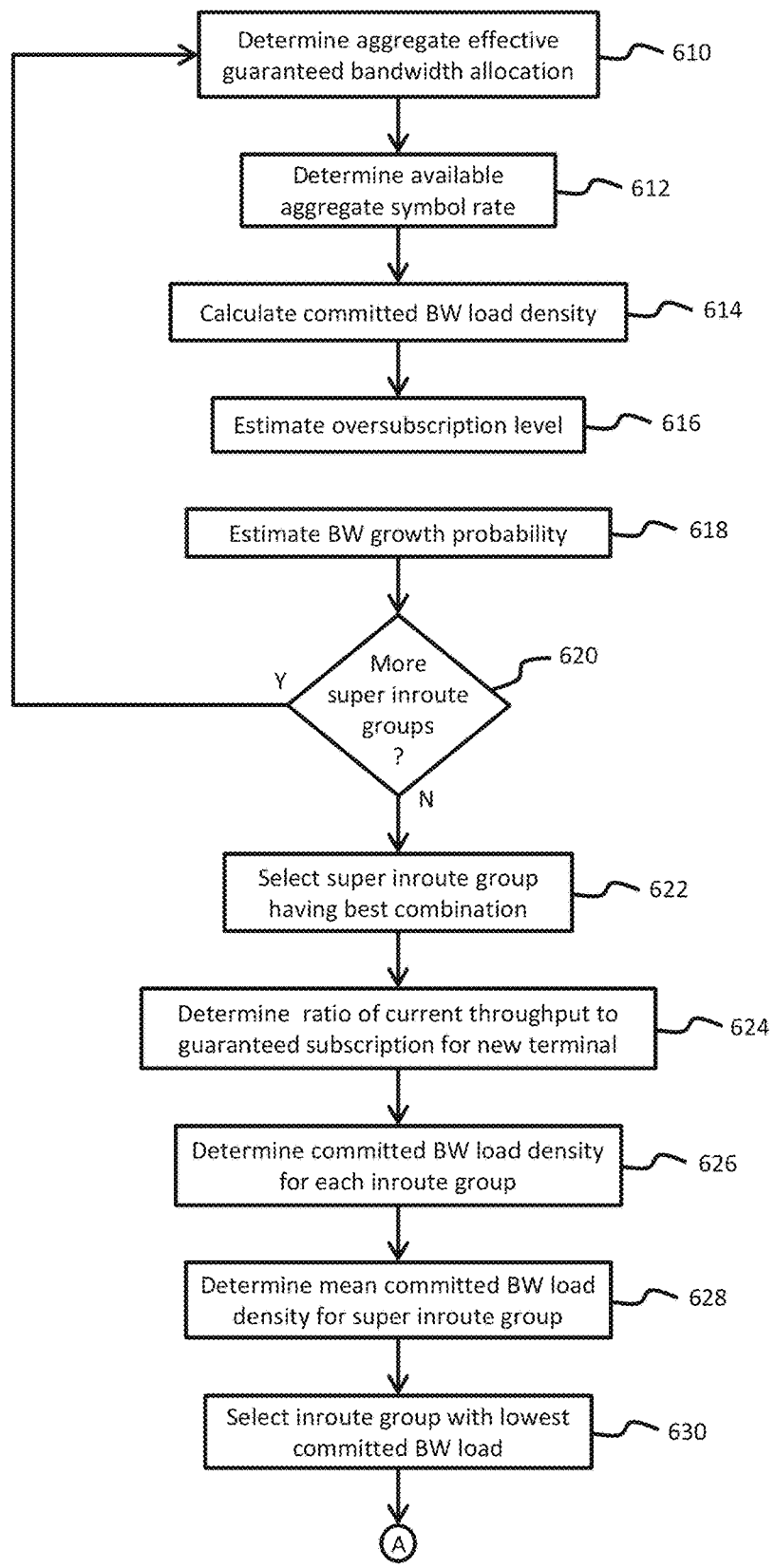
FIGS. 6A and 6B are a flowchart of a process for admitting a new guaranteed service terminal to an inroute, according to various embodiments.
Figure 6B:
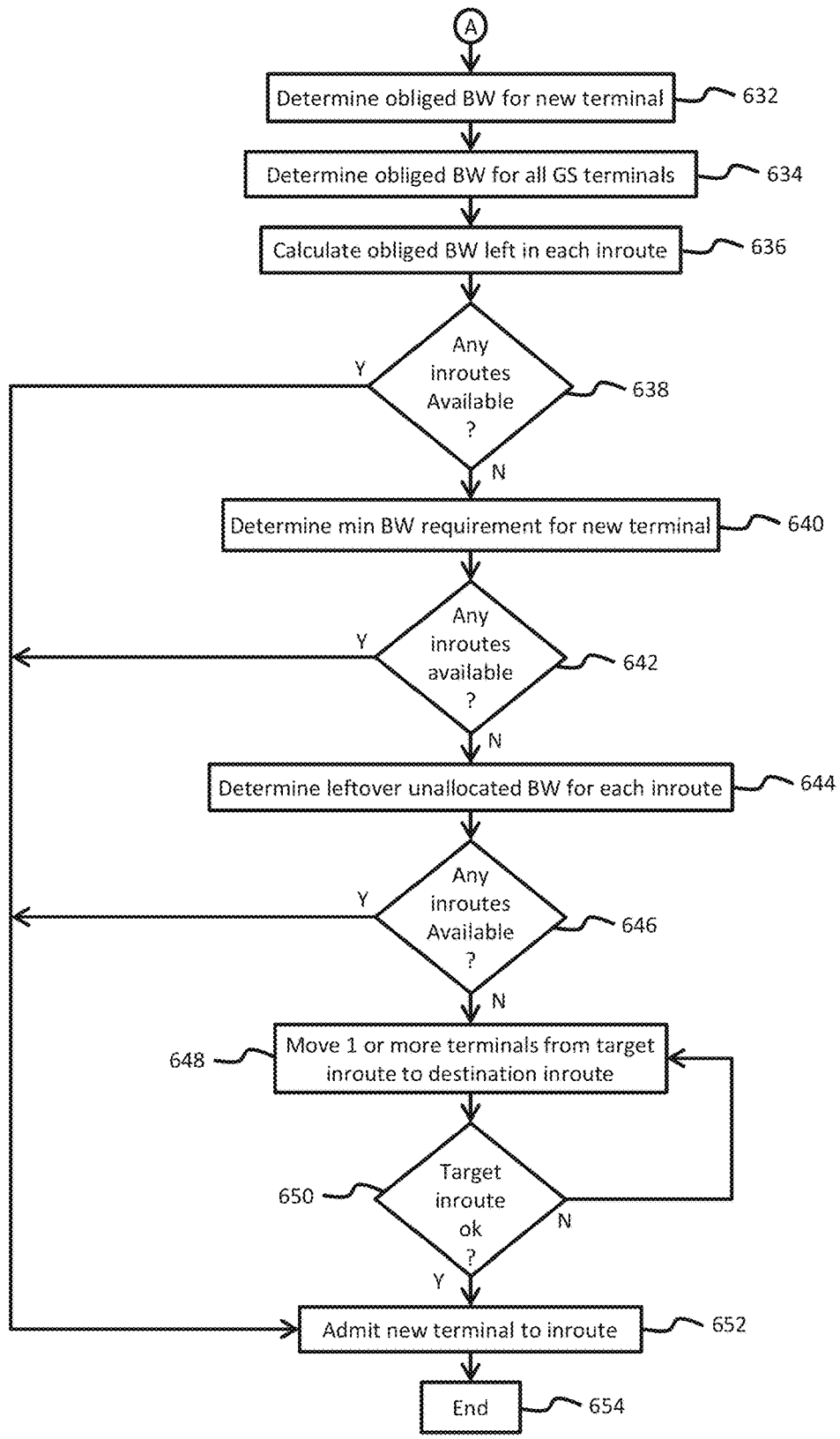

FIGS. 6A and 6B are a flowchart illustrating various steps performed in assigning a new terminal to a particular inroute, in accordance with various embodiments. At 610, the aggregate effective guaranteed bandwidth allocation for the first super inroute group within the selected inroute set is determined. At 612, the available aggregate symbol rate for the super inroute group is determined. At 614, the committed bandwidth load density for the super inroute group is calculated. According to at least one embodiment, the committed bandwidth load density can be based on a ratio of the aggregate effective guaranteed bandwidth allocation to the available aggregate symbol rate.

At 616, and oversubscription level is estimated for the selected super inroute group. The oversubscription level can be based, at least in part, on the estimated oversubscription level for each guaranteed service terminal that is assigned to the super inroute group. At 618, a bandwidth growth probability is estimated for guaranteed service terminals within the super inroute group. At 620, it is determined whether there are additional super inroute groups within the selected inroute set. If additional super inroute groups remain, then control returns to 610 where the previous information is determined for the next super inroute group. If there are no additional super inroute groups within the selected inroute set, then control passes to 622. A super inroute group is selected for the terminal based, at least in part, on the committed bandwidth load density, the oversubscription level, and bandwidth growth probability of each super inroute group. For example, the terminal would preferably select the super inroute group having the lowest committed bandwidth load density or the lowest oversubscription level. The terminal would also preferably select the super inroute group having the lowest bandwidth growth probability.

At 624, information regarding the new terminal is determined. Specifically, the ratio of current throughput to guaranteed subscription required for the new terminal is determined. At 626, a committed bandwidth load density is determined for each inroute group contained within the super inroute group. At 628, a mean committed bandwidth load density for the super inroute group is determined. At 630, the inroute group having the lowest committed bandwidth load density is selected for the new terminal.

At 632, the obliged bandwidth for the new terminal is determined. According to at least one embodiment, the obliged bandwidth can be determined based, at least in part, on a terminal's guaranteed bandwidth subscription and an oversubscription factor of the inroute group being considered or selected for admission. At 634, the obliged bandwidth for all guaranteed service terminals within the selected inroute is determined. At 636, the obliged bandwidth left in each inroute is calculated. At 638, it is determined whether any of the inroutes within the selected inroute group are capable of accommodating the new terminal.

According to at least one embodiment, according to at least one embodiment, this can be accomplished by determining if the obliged bandwidth left in any of the inroutes is greater than the obliged bandwidth of the new terminal. Each inroute having sufficient obliged bandwidth available would be capable of accommodating the new terminal. According to further embodiments, if multiple inroutes are capable of accommodating the new terminal, then the inroute with the most available obliged bandwidth can be selected. If no inroutes are capable of accommodating than you terminal, then the minimum bandwidth requirement for the new terminal is determined at 640.

At 642 it is further determined whether any of the inroutes within the selected inroute group are capable of accommodating the new terminal. According to one or more embodiments, this can be achieved by determining whether the obliged bandwidth available in any of the inroutes are greater than the minimum bandwidth required for the new terminal. If any of the inroutes are capable of accommodating the new terminal, then this inroute is selected at 652. If none of the inroutes are capable of accommodating the new terminal, then the leftover unallocated bandwidth for each inroute is determined at 644. At 646 it is determined whether any of the inroutes are capable of accommodating the new terminal, for example, based on the leftover unallocated bandwidth.

For example, the leftover unallocated bandwidth of each inroute can be compared to the minimum bandwidth requirement for the new terminal. Any inroute having a greater amount of leftover unallocated bandwidth would, therefore, be capable of accommodating the new terminal. If only one inroute is capable of accommodating the new terminal, it would be admitted to this particular inroute. If multiple inroutes are capable of accommodating the new terminal, then various embodiments allow for selection of the inroute with the most leftover unallocated bandwidth. If it is determined, at 646, that none of the inroutes are capable of accommodating the new terminal, then control passes the 648.

Returning to FIG. 6B, at 648, one or more terminals are moved out of the target inroute to a destination inroute. More particularly, the target inroute corresponds to an inroute within the selected inroute group that contains one or more terminals capable of being moved to a different inroute (the destination inroute). The target inroute now becomes the preferred inroute for the new terminal. At 650, it is determined whether the target inroute is now capable of accommodating the new terminal. According to at least one embodiment, this can be based on whether the target inroute contains sufficient left over on allocated bandwidth to accommodate the minimum bandwidth requirement of the new terminal. If the target inroute cannot accommodate the new terminal, control returns to 648 where additional terminals are moved from the target inroute to a destination and route. According to at least one embodiment, the terminals can be moved to the same destination inroute. According to other embodiments, however, each terminal can be moved to a different destination inroute, based on each destination inroute's ability to accommodate the terminal being moved. If the target inroute is capable of accommodating the new terminal after the move, then the new terminal is admitted to the target inroute at 652. The process ends at 654.

Figure 7:
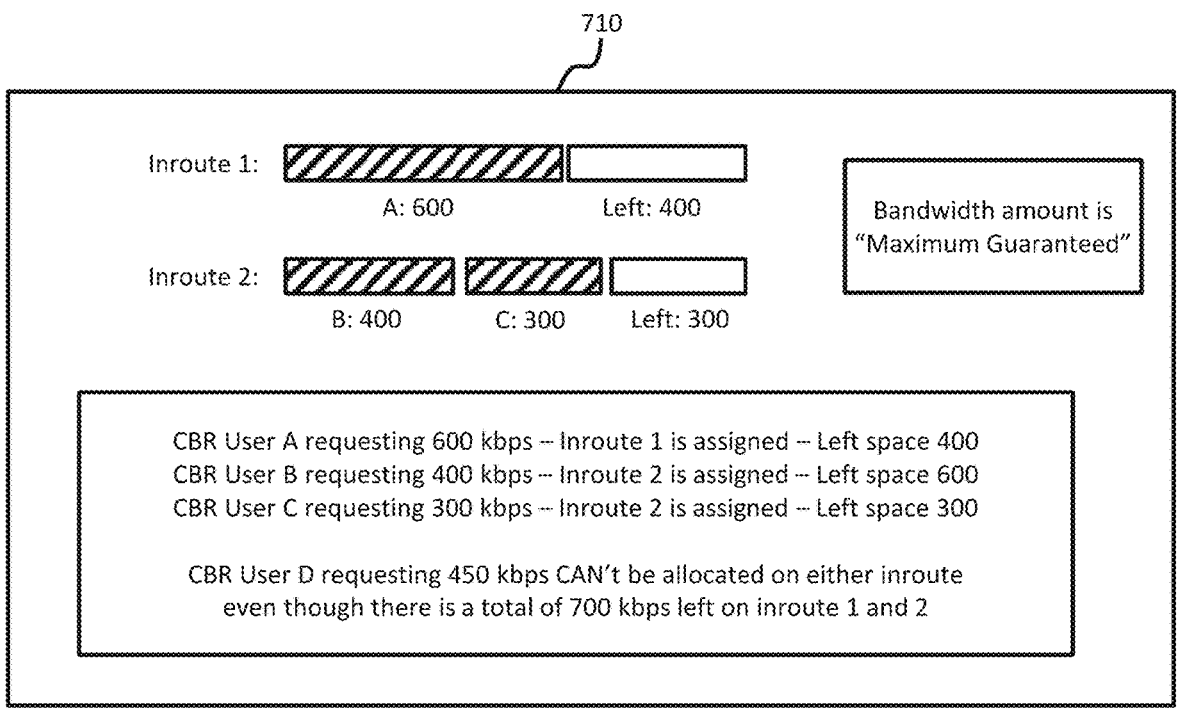
FIG. 7 is diagram illustrating different methodologies for inroute selection, according to various embodiments.
Figure 7:
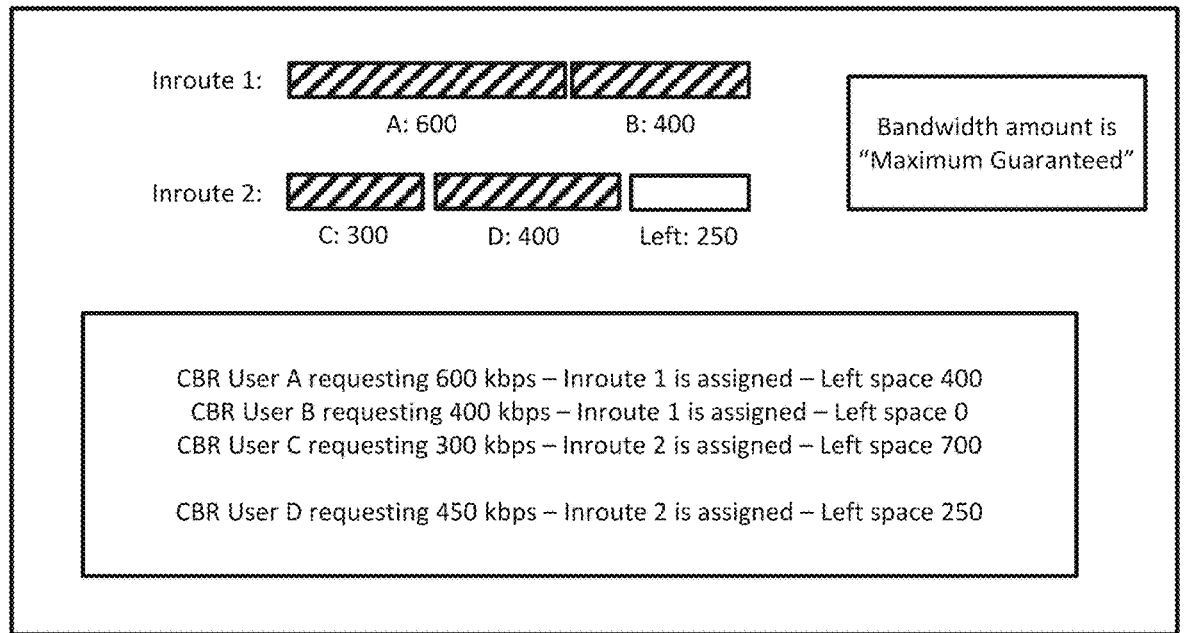

FIG. 7 illustrates various methodologies for inroute selection. Specifically, a least loaded method of terminal admission is identified by reference numeral 710 and a best fit method of terminal admission is identified by reference numeral 720. Each example utilizes the same inroutes and terminals. Using the least loaded method, when CBR user A requests 600 kbps of bandwidth, inroute 1 is assigned, leaving 400 kbps of space available. Next, CBR user B requests 400 kbps of bandwidth. Since inroute 2 is now the least loaded of the two inroutes, CBR user B is assigned to inroute 2 and 600 kbps remains available. CBR user C now requests 300 kbps of bandwidth, and is assigned to inroute 2, leaving 300 kbps of space available. Now, CBR user D requests 450 kbps of bandwidth. Despite having a total of 700 kbps available in the inroute group, CBR user D cannot be accommodated because this bandwidth is fragmented between the two inroutes.

Using the best fit method 720, however, CBR user B would be assigned 400 kbps from inroute 1. This would leave no space available from inroute 1. However, inroute 2 has its entire 1000 kbps available. Accordingly, CBR user C would be allocated 300 kbps from inroute 2. At this point, the inroute group still has 700 kbps available. The request of 450 kbps from CBR user D can be allocated from inroute 2. Thus, all four CBR users have been accommodated, and inroute 2 still has 250 kbps available.

Load Balancing of Inroute Groups

According to various embodiments, super_IG level load balancing results in moving terminals out from a super_IG and moving in to another super_IG. If a super_IG consists of one inroute group, the moved in terminal to that super_IG uses the lone inroute group. But if a super_IG consists of multiple inroute groups, inroute group level load balancing scheme makes sure that the terminal is moved to one of the inroute groups that maintain balanced load within that super_IG. If there are existing terminals moved out of a super_IG, but no new terminals are moved in, then no re-balancing is needed between inroute groups of that super_IG. If there are new terminals moved in from other super_IGs, and no matter whether there are existing terminals moved out or not, committed service and backlog rebalancing are required to restore load balancing across the inroute groups. This form of load balancing is executed between backlog based service and committed service independent of each other. Depending on the particular criteria selected in the system, the committed load balance and the backlog load balance may be executed such that there may be no overlap, partial overlap, or complete overlap between the two operations.

For backlog service rebalancing, the moved in terminals are sorted by the backlog in descending order. The backlog load density of each inroute group of the super_IG is calculated with the residual terminals (some terminals may be moved out) after settlement. The mean backlog load density for the whole super_IG after the settlement is determined and the load density of each inroute group is compared with the mean. For those inroute groups with a load density is less than the mean backlog load density, a delta corresponding to the distance from the mean backlog load density is calculated. A list of inroute groups is created and sorted in descending order of delta. Next, the moved in terminals are dispatched one by one from the sorted list (by backlog) from top-down to fill in the inroute group list in a round robin way until all terminals are dispatched. During the course, new delta is obtained (after dispatching a terminal to an inroute group) and if the delta is zero or positive (mean target is met), then no more dispatched terminals will be assigned to this inroute group. If the target is met for all inroute groups and there are undispatched terminals in the list, one more round robin pass is executed to dispatch the leftover terminals to the inroute groups (all inroute groups are considered).

Because of different subscription and traffic characteristics between backlog based and guaranteed service terminals, the terminal dispatch scheme described for the backlog based terminals is not optimally applicable to ACBR and CIR terminals. If guaranteed service terminals are moving out from a super_IG and no terminals are moving in, then no further load balance is required between inroute groups of this super_IG with respect to committed or guaranteed service bandwidth. But if any guaranteed service terminals are moved in, rebalancing of inroute groups is required with respect to the committed or guaranteed service.

The moved in terminals are sorted by the current throughput to guaranteed subscription ratio in descending order, which means a terminal which has grown more towards its guaranteed subscription will be preferred. Note that a terminal's absolute throughput may be the same but it has a lot of room to grow, then this terminal may be lower in the sorting list. The committed service load density of each inroute group of the super_IG is calculated with the residual terminals (some terminals may move up) after settlement. The mean committed density for the whole super_IG after the settlement is determined and the committed load density of each inroute group is compared with the mean. For those inroute groups with committed load density is less than the mean the delta is calculated and a list of inroute groups is created with these inroute groups in descending order of delta.

Next, the moved in terminals are dispatched one by one from the terminal sorted list (by throughput to subscription ratio) from top-down to fill in the inroute group list in a round robin way until all terminals are dispatched. Note that terminal CQI criteria is checked against the entering CQI requirement. Since a super_IG can have inroute groups of different modulation rates, an inroute group may not be suitable for a dispatched terminal, thus causing the next inroute group in the list to be considered, subject to meeting the CQI requirement. A new delta is obtained after dispatching a terminal to an inroute group, and if the delta is zero or positive (i.e., mean target is met), then no more dispatched terminals will be assigned to this inroute group. If the target is met for all inroute groups and there are undispatched terminals in the list, one more round robin pass is executed to dispatch the leftover terminals to the inroute groups (all inroute groups are considered).

In addition to distributing or dispatching terminals among inroute groups within a super_IG as part of super_IG balancing, the system also performs periodic load balancing across inroute groups within a super_IG. The mean committed service load density is calculated for each super_IG. For each inroute group of a super_IG, the load density is calculated. For IGs whose load density is less than the mean load density of their super_IG, the delta from the target is calculated, which forms one set. For IGs whose load density is greater than the mean load density of their super_IG, the delta from the target is calculated, which forms another set. Two inroute groups corresponding to maximum deltas from two sets are selected. Terminals are then shuffled (or switched) between these groups in order to achieve cancellation of committed load difference until the two inroute groups are balanced. This procedure is iteratively performed until all the inroute groups are balanced.

Periodic committed service load balancing across inroute group within the same super_IG In addition to distributing or dispatching terminals among inroute groups within a super_IG as part of super_IG balancing, the system also performs load balancing across inroute groups within a super_IG periodically and the periodicity can be bigger than the super_IG periodic load balancing using terminals dispatch concept. This scheme is available only if the inroute set is enabled and for committed service. The mean committed service load density is calculated for each super_IG i, $\rho_{mean}^{Super-IGi}$, $i=1 \ldots N$, where N is the total number of super_IGs within an inroute set. The committed service load density of each inroute group k within the super_IG i is also calculated, $\rho_k$, $k=1, \ldots, M$, where M is the number of inroute groups in super_IG i.

For those, calculate $\rho_l < \rho_{mean}^{Super-IGi}$, calculate $\Delta D_l = (\rho_{mean}^{Super-IGi} - \rho_l) S_l$, $l=1 \ldots V$, and for those $\rho_h > \rho_{mean}^{Super-IGi}$, calculate $\Delta D_h = (\rho_h - \rho_{mean}^{Super-IGi}) S_i$, $h=1 \ldots W$.

Determine max of $(\Delta D_l)$ and max of $(\Delta D_h)$, and the corresponding two inroute groups. Next shuffle terminals between these groups to achieve cancellation of committed load difference so that these two inroute groups are balanced. This procedure is also iteratively performed.

Load Balancing Across Inroutes

For backlog based terminal, a terminal is assigned to an inroute with the least backlog volume, subject to satisfying the CQI constraint for this particular inroute. A terminal's guaranteed bandwidth subscription (the committed service load density already includes this factor) is considered when selecting the best possible inroute to admit a guaranteed service terminal into the network. Also, in order to avoid inroute fragmentation, best fit vs. least fit algorithm is used as required to choose an inroute for a ACBR or CIR terminal after determining in which inroute group it will be allocated or moved as required. The initial inroute selection refers to the case of admission of a guaranteed service terminal.

According to an embodiment, the guaranteed service terminal's admission to an inroute follows a process which takes into consideration the terminal's guaranteed bandwidth subscription and probability of growth. This allows selection of the best possible inroute to avoid possible inroute fragmentation. A metric called terminal's obliged bandwidth of an ACBR or CIR terminal is defined as:

Obliged bandwidth of a terminal=guaranteed bw subscription*(1−oversubscription factor of inroute group selected for admission)

For each inroute, the amount of bandwidth left after considering obliged bandwidth of all guaranteed service terminals currently on that inroute is determined. The amount of bandwidth left after considering actual allocated bandwidth of all guaranteed service terminals currently on that inroute is also calculated. Using a best fit method, the new terminal is admitted to an inroute whose obliged bandwidth left is greater than the obliged bandwidth requirement of the new terminal. If such space is not available, then the minimum bandwidth requirement of the terminal is considered. If even minimum cannot be accommodated using the obliged bandwidth left, the least loaded inroute (left over unallocated space) which can accommodate at least the minimum bandwidth of the terminal is selected. The same procedure is also applied in the event of bandwidth growth of a guaranteed service terminal.

According to at least one embodiment, when inroute space can't satisfy the admission request of a guaranteed service terminal, an inroute movement process is pursued within the current inroute group. Inroute CQI and terminal CQI are considered when a terminal is being moved to a different inroute. For example, the following inroute movement strategies can be attempted in the following order: 1) Moving a single user and 2) Moving multiple users.

In order to perform movement of other terminal(s) to accommodate space for the new terminal, the process sorts inroutes by their effective committed service load in ascending order. The sorting algorithm takes into consideration the fact that CIR terminals' guaranteed bandwidth is lower priority than ACBR terminals' guaranteed bandwidth. The growth probability factor is included in the calculation of the effective committed service load on an inroute. A sorting list of potential users is created in order to reduce computing overhead. A guaranteed service terminal which requires less obliged bandwidth and/or whose current load is light is always preferred for moving. On the other hand, a guaranteed service terminal with AC-CBR sessions is less preferred for moving. A backlog terminal with AC-CBR sessions is also less preferred for moving. The effective committed service load is determined by multiplying the committed service allocation with the probability of growth factor.

The process starts from the top of the inroute list. The objective is to determine if sufficient space can be generated on one inroute to accommodate the new terminal, by moving one or multiple terminals from one inroute to another. A similar process is executed when the bandwidth growth of a guaranteed service terminal cannot be accommodated on the current inroute.

When inroute space can't satisfy the requested bandwidth growth an alternative such as possibility of an inroute movement can be pursued. Inroute CQI and terminal CQI are considered when a terminal is being moved to a different inroute. If there is capacity in the inroutes, the following inroute movement strategies will be attempted in the following order: 1) Moving the requesting user, 2) Moving a single user, 3) Moving multiple users.

The requesting user is moved only if its movement number has not exceeded the threshold. Otherwise try to move other users. To find the destination inroute, the process starts from the top inroute in the inroute list arranged in ascending order of effective committed service load.

If moving the requesting user is not possible or the requesting user has AC-CBR sessions, an attempt is made to move another single user out of the inroute of the requesting user in order to find out the space for the requesting user. A terminal with the least effective committed service load is tried first and subsequent in this order. To find the destination inroute of the terminal where it can be moved we start from the top inroute in the inroute list arranged in ascending order of effective committed service load. If a single user movement cannot generate the sufficient space, then multiple users are moved. Again, terminals with AC-CBR sessions are less preferred.

Periodic load balancing at the inroute level is based on the concept of cancellation of load between a pair of inroutes for the case of backlog based balancing. A backlog based centroid is determined for an inroute group and then for each inroute in that inroute group the Euclidian distance of backlog volume is calculated from the centroid. In each iteration, a pair of cancellation inroutes are obtained and terminals are moved between the pair of inroutes to balance them towards the centroid.

The periodic load balancing across inroutes occur in two contexts. The centroid based load balancing scheme as described above is one context but not applicable to the committed service. Additionally, the consequence of super_IG load balancing gives rise to another context of inroute level load balancing. In this context, terminals are moving in from one inroute group to the other. Within an inroute group, when initially moved in, a terminal is assigned to an inroute with the least backlog volume (for backlog based), subject to satisfying the CQI constraint for this particular inroute. This is called "Terminal Dispatch Inroute Load Balancing". For committed service, the selection of inroute follows the same procedure of admission of a terminal as described earlier.

Inroute Level Load Balancing

The following cases give rise to inroute level load balancing for backlog based and committed service based sessions.

When a terminal becomes active and need to be admitted into one of the inroutes in the network When a terminal is moved from one super_IG to other as part of periodic super_IG load balancing When a terminal is moved from one inroute group to other as part of periodic inroute group load balancing for committed service When a hard QoS (or guaranteed service) terminal tries to grow towards its guaranteed bandwidth subscription but not enough resource is available on its current inroute To meet CQI criteria, a terminal would need to be immediately moved to a lower rate inroute For backlog based terminal, a terminal is assigned to an inroute with the least backlog volume, subject to satisfying the CQI constraint for this particular inroute. A hard QoS terminal is assigned to an inroute which is least committed service loaded with respect to allocation to committed service bandwidth according to the current behavior. Terminal's guaranteed bandwidth subscription (the committed service load density already includes this factor) is considered in selecting the best possible inroute to admit a hard QoS terminal into the network.

A variable entity, called obliged bandwidth of a hard QoS terminal is calculated for each terminal based on the following metrics: Guaranteed bandwidth and Over subscription factor.

Obliged bandwidth of a terminal=guaranteed bw subscription*(1−oversubscription factor of an inroute set or inroute group as applicable)

Upon receipt of an admission request from a Hard QoS terminal (could be a new admission or movement from one IG to other), the following steps of actions are performed. In regards to space left on any one of the inroutes, two parameters are defined—LeftG and LeftC. LeftG refers to the amount of bandwidth left on one inroute after taking out the max (obliged bandwidth of hard QoS terminals, current allocation) and AC-CBR sessions of TCBE terminals. LeftC refers to the amount of bandwidth left on one inroute after taking out all the actual allocated bandwidth to hard QoS terminals and AC-CBR sessions of TCBE terminals. LeftC is typically greater than equal to LeftG. When LeftC<LeftG, LeftG is set to LeftC (this case is possible when hard QoS terminals had grown mostly towards their full guaranteed subscription because oversubscription is small).

When movement is from one group to the other, the obliged and minimum bandwidth of the arrived terminal is identified, and its current allocation is determined. The guaranteed available space (LeftG) or currently available space (LeftC) on all qualifying inroutes are checked subject to CQI criteria. If there are multiple inroutes with LeftG greater than or equal to the obliged bandwidth requirement of the terminal, the best fit method is used to admit the terminal in order to reduce unnecessary fragmentation. If sufficient LeftG is not available, then check if there is sufficient LeftG space that is greater than or equal to the minimum bandwidth for new admission or to the current bandwidth allocation for the inroute group move. If there is no sufficient LeftG space that is greater than or equal to the obliged bandwidth or minimum bandwidth or current bandwidth, then select the least loaded inroute with currently available space (LeftC) greater than or equal obliged bandwidth of the requesting user. If the currently available space (LeftC) can't satisfy the obliged bandwidth, check if it is greater than or equal to the minimum bandwidth of the requesting user for a new admission, or to the current bandwidth allocation of the requesting user for inroute group move. If yes, then an inroute is found and the admission request can be granted. If the current inroute space can't satisfy the bandwidth request, then attempt inroute movement procedures.

When inroute space can't satisfy the admission request of a hard QoS (or guaranteed service) terminal, an inroute movement process is pursued within the current inroute group. Inroute CQI and terminal CQI are considered when a terminal is being moved to a different inroute. If the inroute group has the potential capacity to accommodate the requesting user, the following inroute movement strategies will be attempted in the following order: 1) Moving a single user, and 2) Moving multiple users.

The inroutes are first sorted by their effective committed service load in ascending order. The process starts from the top of the list. Movement is not successful, unless the selected user(s) can be accommodated in another inroute(s). It should be noted that terminals with admittance controlled CBR sessions are least preferred for the movement. If neither moving a single user nor moving multiple users without AC-CBR sessions achieve the goal, the terminals with AC-CBR sessions are moved to provide space to accommodate at least the minimum bandwidth requirement of a new terminal.

Moving a Single User

According to at least one embodiment, the following steps can be performed when attempting to select and move a single user from an inroute to another in order to accommodate a new admission request.

1) Start with the top of the sorted inroute list (initially skip the inroutes having AC-CBR sessions and after exhausting all the inroutes AC-CBR inroutes are selected in the order in the list)—this may need to be repeated for other inroutes.

2) Qualify a potential user on the inroute—this may need to be repeated for other users.

3) Start with a potential user (from terminal sorting list on inroute) on the least loaded inroute whose movement number has not exceeded and not having AC-CBR sessions. If no more terminals are available on this inroute, choose terminal with AC-CBR session if exists and not exceeded the number of allowed moves. When a terminal with AC-CBR sessions is selected, this terminal can be moved to another inroute if and only if the AC-CBR sessions can be accommodated fully.

4) Verify if one of the following criteria can be met:
A) Ensure the sum of the guaranteed space left (LeftG) of the inroute and the potential user's current allocation is greater than or equal to the obliged bandwidth of the requesting user.
B) If A cannot be met, ensure the sum of the guaranteed space left (LeftG) of the inroute and the potential user's current allocation is greater than or equal to the minimum required bandwidth of the requesting user for a new admission or to the current allocated bandwidth of the requesting user for an inroute group move.
C) If B cannot be met, ensure the sum of the allocated space left (LeftC) of the inroute and the potential user's current allocation is greater than or equal to the obliged required bandwidth of the requesting user.
D) if C cannot be met, ensure the sum of the allocated space left (LeftC) of the inroute and the potential user's current allocation is greater than or equal to the minimum bandwidth requirement of the requesting user for a new admission or to the current allocated bandwidth of the requesting user for an inroute group move.

5) If a potential user is selected (if one of the conditions in step 4 is met), then verify that the user can be accommodated in another inroute, continue to Step 6.

6) Start with a least loaded inroute from the sorted list (exclude the current inroute from where it is to be moved)—this may need to be repeated.

7) Verify if one of the following criteria can be met:
A) Inroute guaranteed space left (LeftG) is greater than or equal to the required obliged or current bandwidth of the potential user, whichever is greater (LeftG>max (obliged, curbw)
B). If A cannot be met, find out inroute space left (LeftC) is greater than or equal to the obliged bandwidth of the potential user or the current bandwidth of the potential user, whichever is greater (LeftC>max (obliged, curbw)

8) If the user can't be accommodated on this inroute, repeat step 6.

9) If none of the inroute(s) can accommodate the user, repeat step 2.

10) If this is not possible, repeat the entire user selection procedure on another inroute, starting from step 1.

11) If successful, move the potential user, else skip to step 13.

12) Increment the movement number of the potential terminal which is moved.

13) Perform bandwidth accounting and admit the new user.

14) If no potential user is found, attempt to move multiple users.

Moving multiple users

The following steps are performed when attempting to select and move multiple users from an inroute to another in order to accommodate a new admission request, according to an embodiment.

1) Start with the top of the sorted inroute list—this may need to be repeated for other inroutes. (initially skip the inroutes having AC-CBR sessions and after exhausting all the inroutes AC-CBR inroutes are selected in the order in the list).

2) Qualify a potential user on the inroute—this may need to be repeated for other users.

3) Start with a potential user (from the sorting list) on the least loaded inroute whose movement number has not exceeded and not having AC-CBR sessions. If no more terminals are available on this inroute, choose terminal with AC-CBR session if exists and movement number has not exceeded allowed move for AC-CBR session. Repeat this step until space requirement has been met or no more space is available. According to various embodiments, a limit may be set on the number of users that may be moved. Thus, once the maximum number of users have been moved, step 4 would be performed instead of repeating step 3.

4) At the minimum, verify if one of the following is met using the order below:
   A) Ensure the sum of the guaranteed space left (LeftG) of the inroute and all the current bandwidth of the selected users is greater than or equal to the obliged required bandwidth of the requesting user.
   B) If A is not met, ensure the sum of the guaranteed space left (LeftG) of the inroute and all the current bandwidth of the selected users is greater than or equal to the current required bandwidth of the requesting user.
   C) If B is not met, ensure the sum of the left space of the inroute (LeftC) and all the current bandwidth of the selected users is greater than or equal to the obliged required bandwidth.
   D) If C is not met, ensure the sum of the left space of the inroute (LeftC) and all the current bandwidth of the selected users is greater than or equal to the current required bandwidth.

5) If multiple potential users are selected, then verify that each of these users must be accommodated in another inroute(s) successfully.

6) For each user, start with a least loaded inroute—this may need to be repeated.

7) Ensure that one the following is met:
   A) Inroute guaranteed space left (LeftG) is greater than or equal to the required obliged or current bandwidth of the potential user, whichever is greater (LeftG>max (obliged, curbw).
   B) If A is not met, ensure that inroute space left is greater than or equal to the obliged bandwidth of the potential user or the current bandwidth of the potential user, whichever is greater (LeftC>max (obliged, curbw).

8) If any of the users can't be accommodated, repeat step 6.

9) If none of the inroute(s) can accommodate the user, repeat step 2 .

10) If this is not possible, repeat the entire user selection procedure on another inroute, step 1.

11) If successful, move each of the potential users, else skip to step 14.

12) Increment the movement number of the potential terminal which is moved.

13) Perform bandwidth accounting and admit the new user.

14) If moving multiple-users selection not successful, log the rejection occurrence with the appropriate cause code and reject the new admission request. For a new admission, this is a rejection whereas for a movement from one IG to another, the terminal remains in the current inroute group (not moved).

Figure 8:
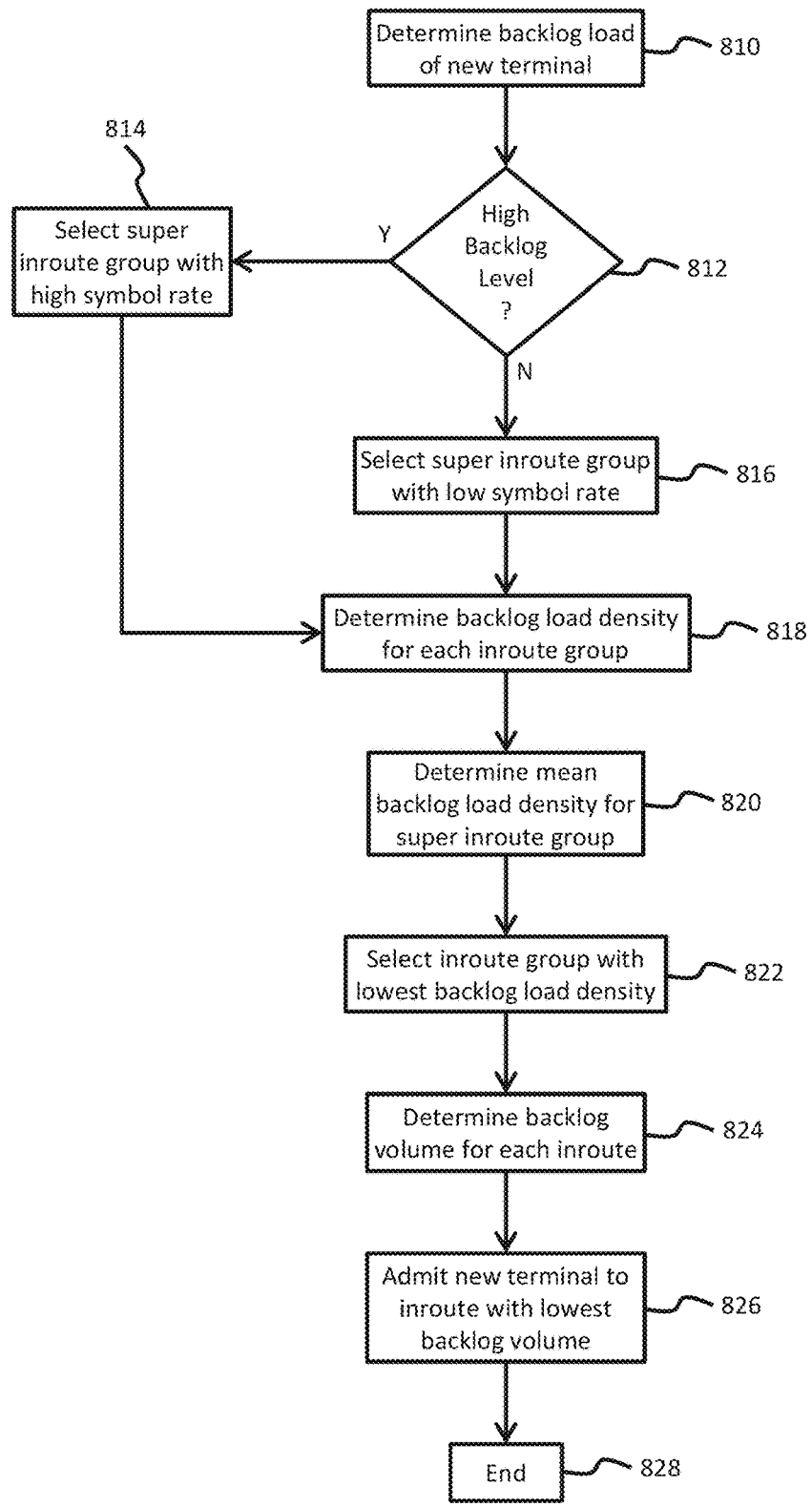
FIG. 8 is a flowchart of a process for admitting a new backlog terminal to an inroute, according to various embodiments.

FIG. 8 is a flowchart illustrating steps performed to admit a new backlog terminal into an inroute of a selected inroute set, in accordance with one or more embodiments. At 810, the backlog load of the new terminal is determined. At 812, it is determined whether the new terminal has a high backlog level. According to at least one embodiment, various thresholds can be set in order to classify backlog terminals as having a high backlog level. For example, a predetermined value for the ratio of the backlog terminal's current backlog load relative to its total subscription can be utilized. A ratio of the backlog terminal's current backlog load relative to its highest backlog load over a predetermined time period can also be utilized. If the backlog level exceeds a value, for example, of 80%, then the backlog level can be classified as being high. According to further embodiments, a low backlog limit (or threshold) can also be set in a similar manner. For example, a backlog level below 20% can be considered low.

If the backlog level of the new terminal is determined to be high, at 812, a super inroute group with a high symbol rate is selected for the new backlog terminal at 814. Alternatively, if the backlog level of the new terminal is not considered to be high, then control passes to 816 where a super inroute group with a low symbol rate is selected. As previously discussed, each super inroute group within an inroute set is configured to operate at a different symbol rate. Thus, super inroute groups with higher and lower symbol rate can be compared when the new terminal is being assigned. According to at least one embodiment, if the selected inroute set contains only one super inroute group, the new backlog terminal would be assigned to this super inroute group regardless of its backlog level. At 818, a backlog load density is determined for each inroute group within the selected super inroute group. At 820, the mean backlog load density for the super inroute group is determined.

At 822, the inroute group having the lowest backlog density is selected for the new backlog terminal. According to various embodiments, when the backlog density of the inroute groups are determined, they can be sorted in a list based on increasing order of backlog load density. The first inroute group in the list could then be selected by the new backlog terminal. At 824, the backlog volume of each inroute is determined. Similar to the backlog load density of the inroute groups, the backlog volume of each inroute can be sorted in order of increasing backlog volume. Accordingly, the first inroute from the list would have the lowest backlog volume while the last inroute from the list would have the highest backlog volume. At 826, the new backlog terminal is admitted to the inroute with the lowest backlog volume. The process end at 828.

Admittance Controlled CBR Sessions Balancing

Admittance controlled CBR sessions are reserved bandwidth on-demand streaming service provided to ACBR, CIR and TCBE terminals. Note that although TCBE is mainly based on backlog based allocation, it can support CBR sessions as an add-on service. According to an embodiment, if a terminal's CQI can no longer operate the terminal on a super_IG (symbol rate), the inroute resource manager immediately moves a terminal with AC-CBR sessions to a lower super_IG meeting the required CQI. In the case where a terminal was initially admitted to a lower throughput inroute group because of only 1-2 AC-CBR sessions and later produces a big backlog because of large upload, such a terminal this terminal would be moved to another inroute group with all of its CBR sessions. In particular, various embodiments ensure that new inroute AC-CBR sessions can be maintained with enough available bandwidth unless the movement is due to CQI decrement and the terminal needs to be assigned to a lower symbol rate group or fallback group. AC-CBR sessions movement is also applied in the context of guaranteed service terminals. For CBR session growth of backlog based terminals (TCBE), the same procedure that is applied to committed server can be used.

According to an embodiment, it may become necessary to move terminals with AC-CBR sessions if: i) the AC-CBR sessions have grown, or ii) other traffic has grown. The following rules can be applied in regards to AC-CBR session movement, regardless of guaranteed or backlog service terminals when load balancing becomes necessary.

A) For availability, when the terminal cannot maintain CQI on the current inroute group, the terminal with CBR sessions is immediately moved to a lower super_IG. Depending on the congestion level of the super_IG with lower symbol, calls may or may not be maintained.

B) With the exception of link degradation as captured in A), for movement due to load balancing, the terminal is insured to receive at least all the existing AC-CBR sessions on the new inroute group and on the new inroute.

C) AC-CBR sessions (even for the sessions from TCBE terminals) are included in the calculation of committed service load metric and committed service load density. The backlog density for TCBE terminals does not include AC-CBR sessions from TCBE terminals.

D) In the terminal dispatch process between two super_IGs, guaranteed service terminals or backlog terminals with AC-CBR sessions are moved in or out subject to obtaining required bandwidth on an inroute of the new inroute group for all the AC-CBR sessions. If that is not possible, then this terminal is not moved and the next terminal is selected from the sort list. The same logic is applicable for periodic movement between inroute groups.

E) When other terminals are moved to make room for the growth of a terminal or for the admission of a new terminal, it is ensured that moved terminals, if loaded with AC-CBR sessions, will get enough bandwidth for all their CBR sessions on the new inroutes so that calls will remain intact.

F) When a terminal is moved to support bandwidth growth, it is ensured that on the new inroute this terminal, loaded with AC-CBR sessions, will get enough bandwidth for all its CBR sessions in order to keep the calls intact.

Seamless load balancing with respect to Latency and Jitter

It has been discussed that a terminal may need to be moved from one inroute to other within the same inroute group and also across different inroute groups, all of them can be of the same symbol and modulation rate or different. For real time CBR sessions, a terminal movement process ensures that no packet loss, no momentary extra latency and jitter. According to an embodiment, this can be subject to the condition that the terminal has not moved to a lower symbol rate inroute group to meet CQI or moved to an inroute group that lacks sufficient bandwidth left to accommodate all the AC-CBR sessions of the moved terminal.

When the movement is between inroutes within an inroute group, frame to frame seamless movement is supported. When inroute movement is between different inroute groups, the inroute resource manager sends a change inroute group command to the terminal along with an indication of the future frame when the allocation on the changed group will be provided. The terminal looks for the allocation on the new group and starts transmitting using the new allocation. The terminal does not need to send an ALOHA request to receive bandwidth from the new group.

Figure 9:
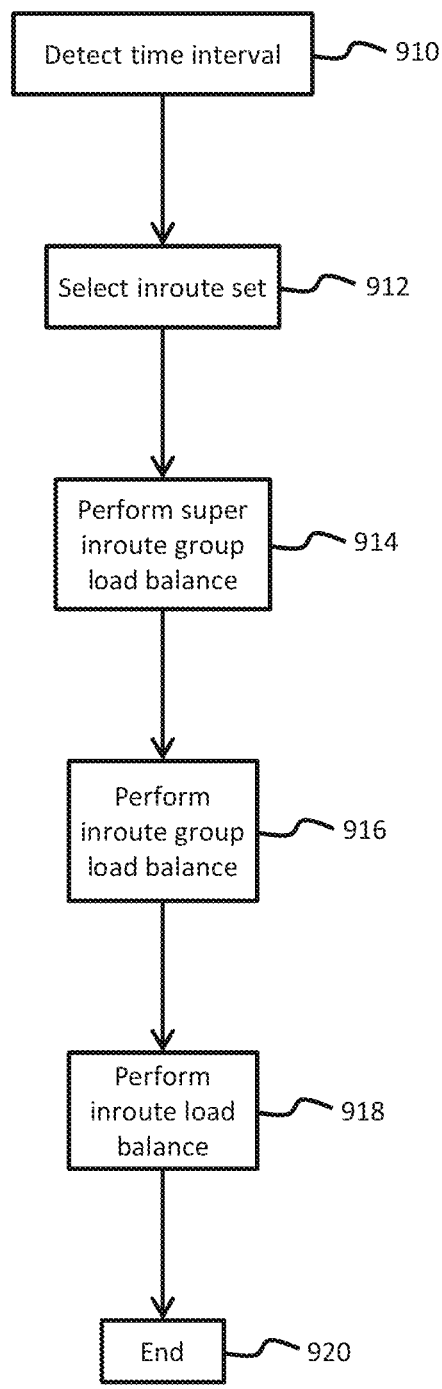
FIG. 9 is a flowchart of a process for periodic load balancing of an inroute set, according to at least one embodiment.

FIG. 9 illustrates various steps performed when periodically balancing inroute traffic, in accordance with one or more embodiments. At 910, a predetermined time interval is detected. Depending on specific design requirements, for example, the time interval can be set for a few seconds, 60 seconds, 90 seconds, a few minutes, etc. Whenever the system detects that the selected time interval has elapsed, then an automatic inroute load balancing can be initiated. At 912, a particular inroute set is selected to be rebalanced. Depending on the manner in which inroute traffic within a particular coverage beam is grouped, one or more inroute sets may be defined. If only one inroute set is defined, then that particular inroute set would be automatically rebalanced. If multiple inroute sets are defined, then each inroute set could be sequentially selected to be rebalanced. Furthermore, rather than selecting a particular inroute set for rebalancing, all of the inroute sets could be simultaneously rebalanced in parallel.

At 914, a super inroute group load balance is performed. This can be done, for example, based on the number of super inroute groups within the selected inroute set. If the selected inroute set contains only one super inroute group, then no super inroute group load balance is performed. At 916, an inroute group load balance is performed for the selected super inroute group. This causes the inroute traffic load within the selected super inroute group to be balanced. At 918, an inroute load balance is performed in order to balance the inroute traffic across all of the inroute within the selected inroute group. The process ends at 920.

Figure 10A:
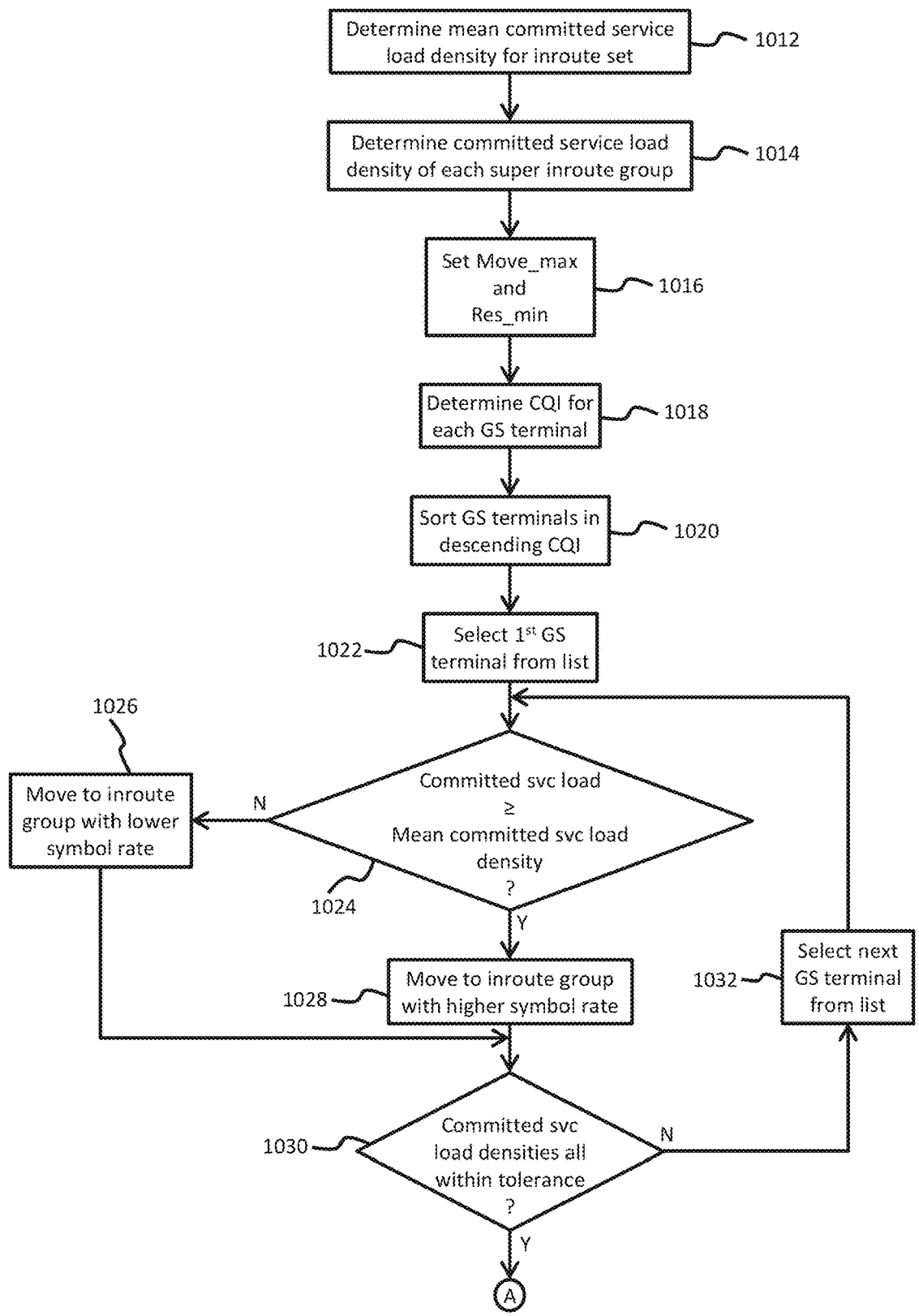
FIGS. 10A and 10B are a flowchart of a process for periodic rebalancing guaranteed service terminals of an inroute set, according to various embodiments.
Figure 10B:
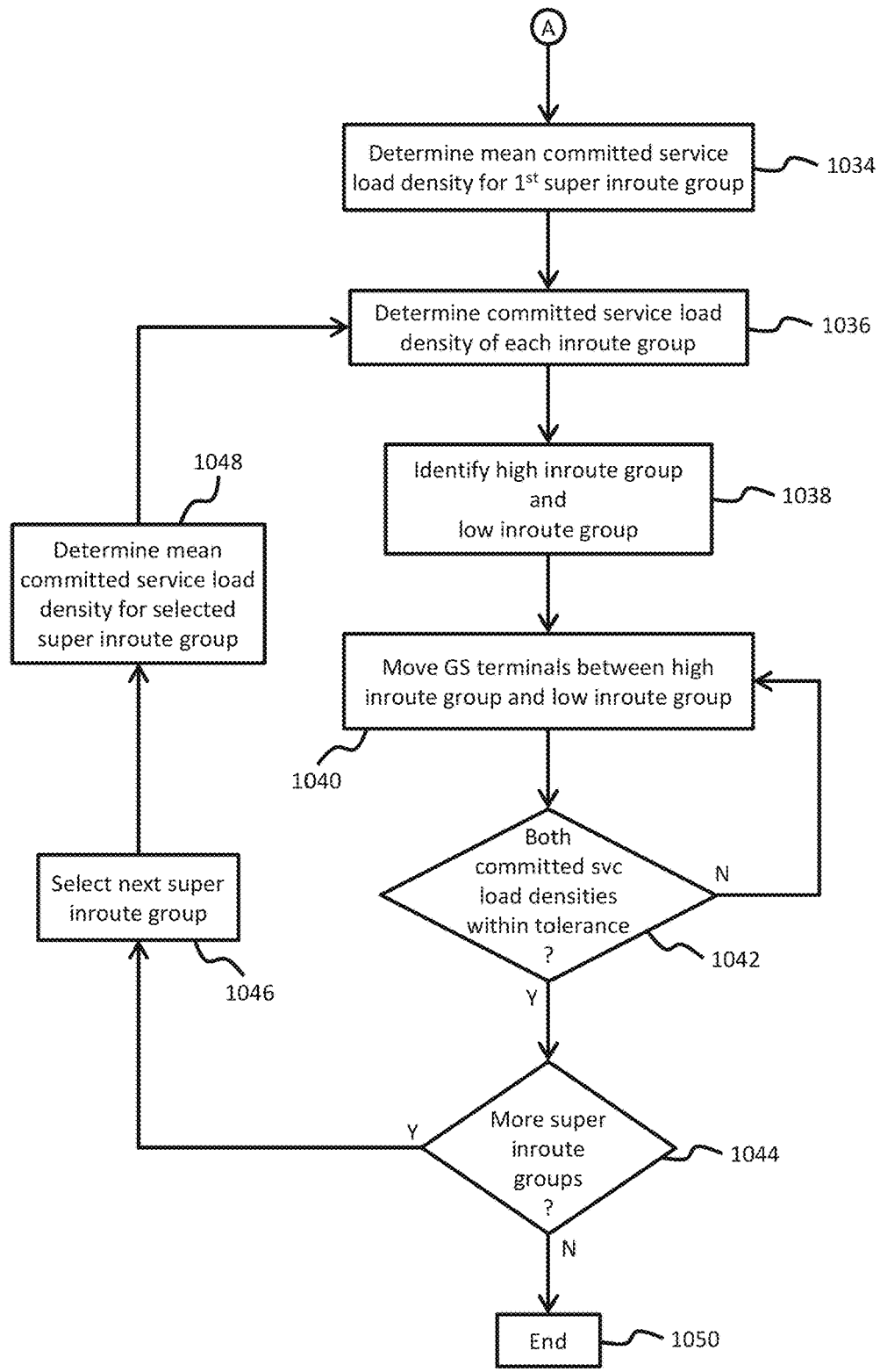

FIGS. 10A and 10B are a flowchart illustrating details for periodic load balancing of guaranteed service terminals within an inroute set. At 1012, a mean committed service load density is determined for the inroute set. At 1014, a committed service load density is determined for each super inroute group within the inroute set. At 1016, a predetermined maximum number of moves is set for guaranteed service terminals within the selected inroute set. Similarly, a minimum residency period is set for each guaranteed service terminal within the selected inroute set. The maximum number of moves can correspond, for example, to the maximum number of times a particular guaranteed service terminal is allowed to be moved to a different inroute. The minimum residency period can correspond, for example, to the minimum amount of time a terminal must reside within a particular inroute before it is allowed to move. According to various embodiments, the maximum number of allowed moves and the minimum residency can be based, at least in part, on predetermined time intervals. Thus, after expiration of the predetermined time intervals, these values could be reset for a particular terminal.

At 1018, a CQI is determined for each guaranteed service terminal within the selected inroute set. At 1020, the guaranteed service terminals are sorted in descending order of their CQI. At 1022, the first guaranteed service terminal from the list is selected. At 1024, it is determined whether the committed service load of the selected guaranteed service terminal is greater than or equal to the mean committed service load density for the selected inroute set. If the committed service load of the selected guaranteed service terminal is not greater than, or equal to, the mean committed service load density of the selected inroute set, then the guaranteed service terminal is moved to an inroute group with a lower symbol rate at 1026. If the committed service load of the selected guaranteed service terminal is greater than or equal to the mean committed service load density of the selected inroute set, however, the guaranteed service terminal is moved to an inroute group with a higher symbol rate at 1028.

At 1030, it is determined whether the committed service load density of all the super inroute groups are within a predetermined tolerance. Depending on the specific embodiment, the tolerance can be set to a percentage of the committed service load densities of the super inroute groups. For example, the selected tolerance can dictate that the committed service load densities of all super inroute groups must be within a particular percentage (1%, 2%, 5%, 10%, etc.) of each other. If the committed service load densities are not all within the predetermined tolerance, then control passes to 1032. The next guaranteed service terminal from the list is selected. Control then returns to 1024.

If the committed service load densities of all the super inroute groups are within the predetermined tolerance, control passes to 1034. A mean committed service load density is determined for the first super inroute group within the selected inroute set. According to at least one embodiment, the mean committed service load density for each super inroute group can be determined and sorted in order of increasing mean committed service load density. Accordingly, the first super inroute group from the sorted list could be selected at 1034. At 1036, the committed service load density is determined for each inroute group within the super inroute group. At 1038, a high inroute group and a low inroute group are identified.

According to at least one embodiment, the high inroute group can correspond to the inroute group having the highest committed service load density. Similarly, the low inroute group can correspond to the inroute group having the lowest committed service load density. According to further embodiments, the inroute groups can be sorted in a list based on increasing order of committed service load density. The high inroute group would correspond to the last entry in the list, while the low inroute group would correspond to the first entry in the list. At 1040, one or more guaranteed service terminals are switched between the high inroute group and the low inroute group. At 1042 it is determined whether both committed service load densities are within a predetermined tolerance of the mean committed service load density for the super inroute group. More particularly, after one or more guaranteed service terminals are moved between the high inroute group and the low inroute group, their committed service load densities should change, and continue to approach the mean committed service load density for the super inroute group.

If the committed service load densities of both the high inroute group and the low inroute group are not within the preset tolerance, control returns to 1040, where additional guaranteed service terminals can be moved between the high inroute group and the low inroute group. If both committed service load densities, however, are within the preset tolerance, then control passes to 1044. It is determined whether more super inroute groups are available. If additional super inroute groups remain within the selected inroute set, then control passes to 1046 where the next super inroute group is selected. At 1048, the mean committed service load density is determined for the selected super inroute group. Control then returns to 1036. If it is determined at 1044 that no additional super inroute groups are available, then the process ends at 1050.

Figure 11A:
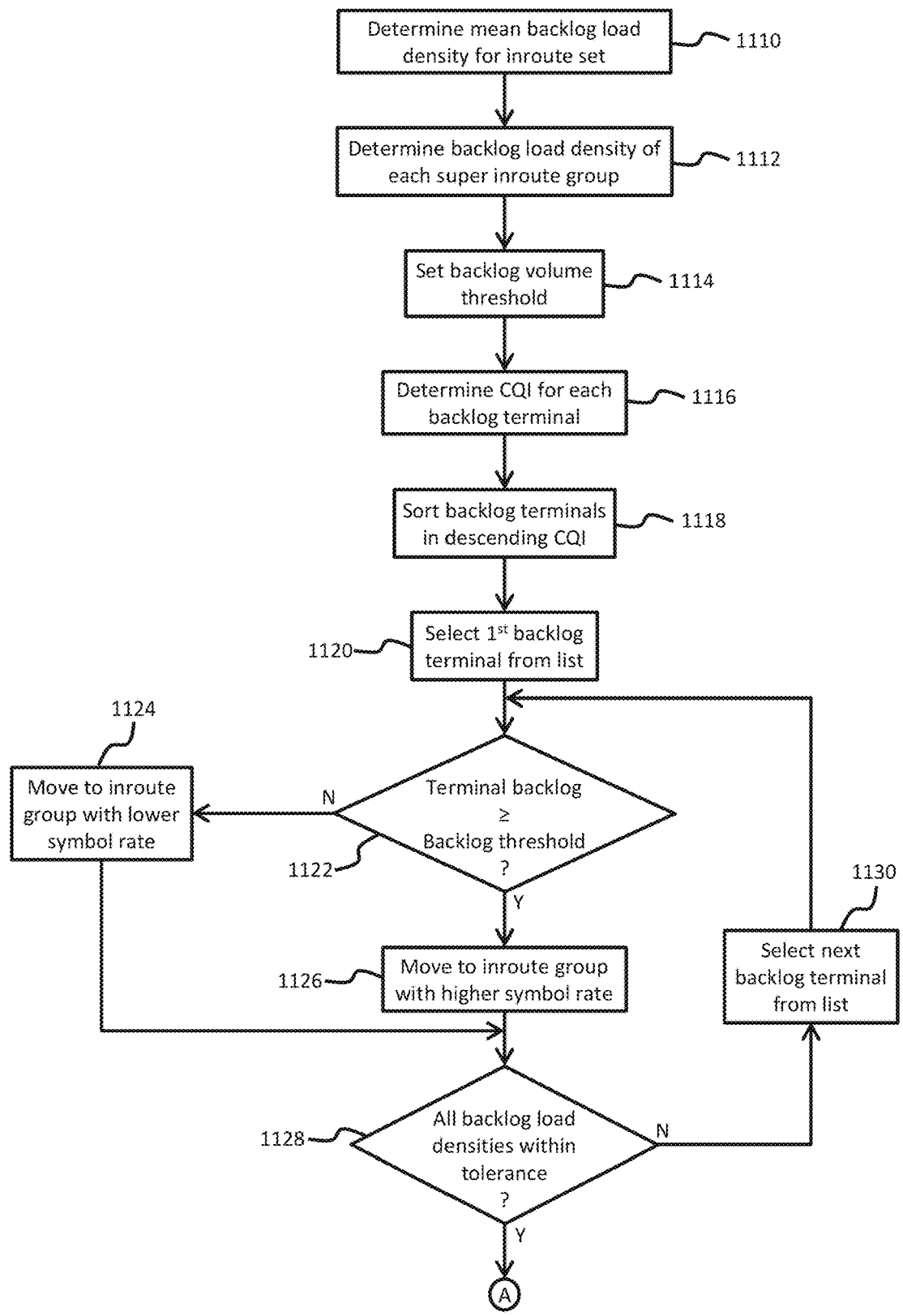
FIGS. 11A and 11B are a flowchart of a process for periodic rebalancing backlog terminals of an inroute set, according to various embodiments.
Figure 11B:
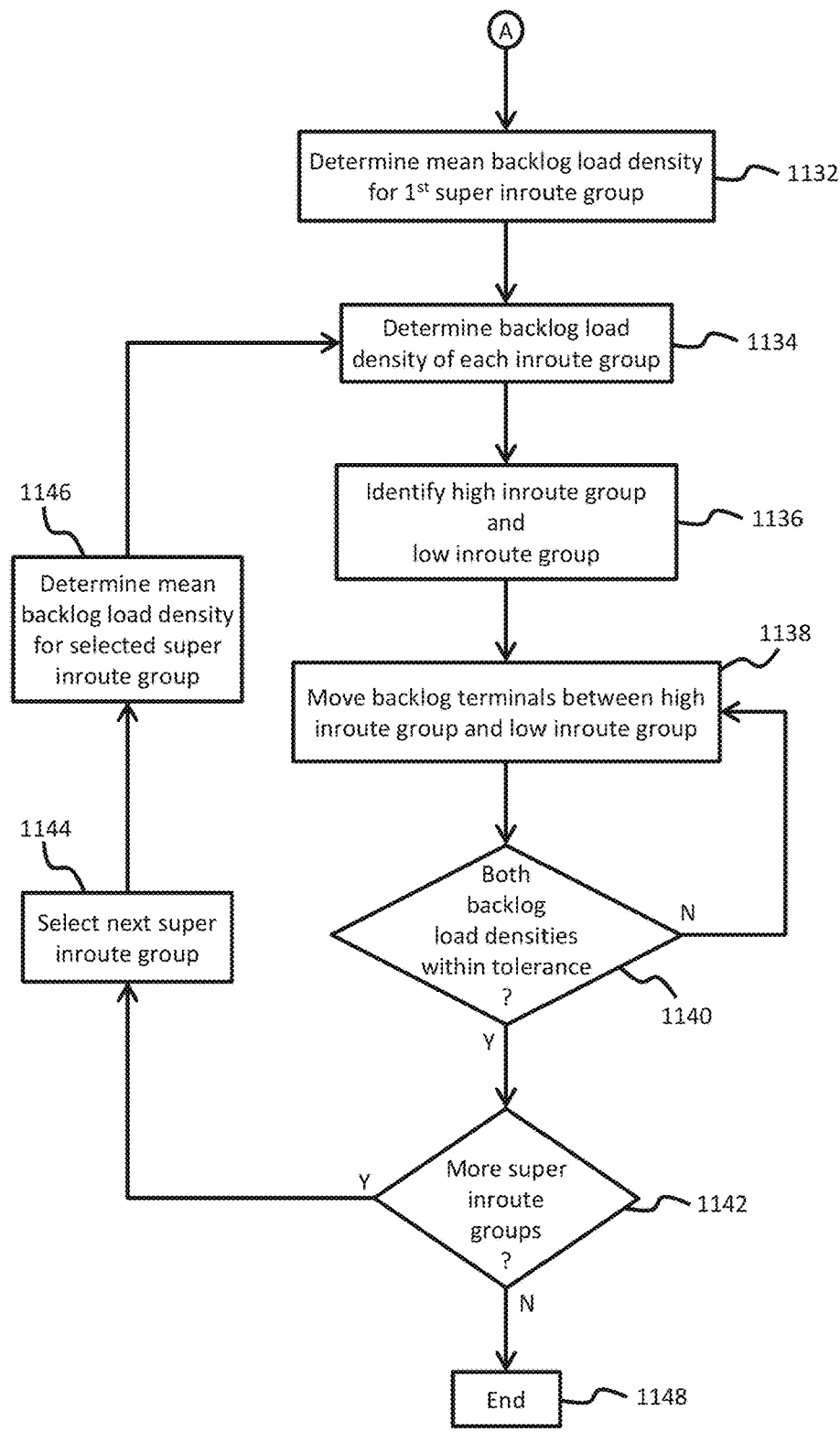

FIGS. 11A and 11B are a flowchart illustrating the steps performed in rebalancing backlog terminals within an inroute set. At 1110, a mean backlog load density is determined for the inroute set. At 1112, a backlog load density is determined for each super inroute group. At 1114, a backlog volume threshold is set. At 1116, the channel quality index (CQI) is determined for each backlog terminal in the inroute set. At 1118, the backlog terminals are sorted in descending order of their CQI. At 1120, the first backlog terminal is selected from the list. This corresponds to the backlog terminal having the highest channel quality index. At 1122, the selected terminal's backlog level is compared to the backlog volume threshold. If the terminal's backlog level is less than the backlog volume threshold, then the terminal is moved to an inroute group with a lower symbol rate at 1124. If the terminal's backlog level is greater than or equal to the backlog threshold, then the terminal is moved to an inroute group with a higher symbol rate at 1126.

At 1128, it is determined whether all backlog load densities for the super inroute groups are within a predetermined tolerance of the mean backlog load density for the inroute set. More particularly, the backlog load density of each super inroute group is examined in order to determine whether it is within an acceptable limit of the mean backlog load density of the inroute set. Depending on the particular embodiment, the predetermined tolerance may be a relative value such as a percentage (e.g., 0.1%, 0.5%, 1%, 2%, 5%, etc.) of the mean backlog load density of the inroute set. If all backlog load densities are not within the predetermined tolerance from the mean backlog load density of the inroute set, then control passes to 1130 where the next backlog terminal from the list is selected. Control then returns to 1122.

If all backlog load densities are within the predetermined tolerance, however, control passes to 1132. The mean backlog load density is determined for the first super inroute group. At 1134, the backlog load density is determined for each inroute group within the selected super inroute group. At 1136, a high inroute group and a low inroute group are selected. According to an embodiment, the high inroute group can correspond to the inroute group having the highest backlog load density. Similarly, the low inroute group can correspond to the inroute group having the lowest backlog load density. According to further embodiments, the inroute groups can be sorted in a list based on increasing order of backlog load density. The high inroute group would correspond to the last entry in the list, while the low inroute group would correspond to the first entry in the list.

At 1138, backlog terminals are moved between the high inroute group and the low inroute group. At 1140, it is determined whether both backlog load densities are within a preset tolerance of the mean backlog load density for the super inroute group. If both backlog load densities are not within the preset tolerance, then control returns to 1138 were additional backlog terminals are moved between the high inroute group and the low inroute group. If both backlog load densities are within the preset tolerance, then control passes to 1142 where it is determined whether the inroute set contains additional super inroute groups. If there are additional super inroute groups remaining, then the next super inroute group is selected at 1144. At 1146, the mean backlog load density is determined for the selected super inroute group. Control then returns to 1134. If there are no additional super inroute groups remaining, then control passes to 1148 where the process ends.

Bandwidth Growth

According to various embodiments, when the throughput of a hard QoS terminal increases, the next quantized level or next step bandwidth must be allocated. Upon receipt of a request for bandwidth growth from a hard QoS terminal, various steps can be performed to determine whether or not the additional bandwidth can be allocated. First, the total bandwidth required after the request growth is calculated and compared to the obliged bandwidth of the requesting terminal's current inroute. Next, LeftG available after bandwidth growth, LeftG currently available, and LeftC space for the requesting terminal's current inroute are determined. If there is sufficient bandwidth available for the bandwidth growth (either LeftG or LeftC can satisfy), the request for bandwidth growth is granted. If the current inroute space cannot satisfy the bandwidth requested, then an inroute movement procedure may be attempted. If nothing is possible, the bandwidth growth request can be rejected. The user would, therefore, continue to receive its currently allocated bandwidth.

According to at least one embodiment, when inroute space is not available to satisfy the requested bandwidth growth, an alternative solution such as possible inroute movement can be pursued. Furthermore, the inroute CQI and terminal CQI can be considered when a terminal is being moved to a different inroute. If there is capacity in the inroutes, the following inroute movement strategies will be attempted. A single terminal user may be moved from the requesting terminal's inroute in order to create additional space (or bandwidth). If moving a single user, does not create sufficient space, then multiple users may be may be moved. According to at least one embodiment, a maximum number can be set to limit the number of users that may be moved. For example, if the maximum number of users is set to 5, then no more than 5 users would be moved in an attempt to satisfy the requested bandwidth growth. Finally, the requested user may be moved to another inroute, if it is still not possible to allocate the requested bandwidth.

Moving a Single User

According to an embodiment, the following steps can be applied to move a single user from the requesting terminal's inroute:

Select a potential user (from the terminal sorting list) on the inroute where the requesting terminal resides and whose movement number has not exceeded the maximum number of moves. The potential user also must not have AC-CBR sessions. If no potential users are available on this inroute, then a potential user having AC-CBR sessions can be selected if their movement does not exceed the AC-CBR session maximum allowed move. When a terminal with AC-CBR sessions is selected, this terminal can be moved to another inroute only if the AC-CBR sessions can be fully accommodated. This may be repeated for other users At the minimum, verify if one of the following is met using the order below:

A) Ensure the sum of the guaranteed space left (LeftG) of the inroute and the user's current allocation must be greater than or equal to obliged bandwidth requested or at the minimum the total required bandwidth of the requesting user, whichever is greater.

B) Ensure the sum of the left space (LeftC) of the inroute and the user's current allocation must be greater than or equal to obliged bandwidth requested or the total required bandwidth of the requesting user, whichever is greater.

3) If a potential user is selected, then verify that the user can be accommodated in another inroute.

4) Start with a least loaded inroute (from the sorting list)—this may need to be repeated.

5) Ensure that the following are met:

A) Inroute guaranteed space left (LeftG) is greater than or equal to the required obliged or current bandwidth of the potential user, whichever is greater.

B) inroute space left is greater (LeftC) or equal to the obliged bandwidth of the potential user or the current bandwidth of the potential user, whichever is greater.

6) If the selected user can't be accommodated, repeat step 5.

7) If none of the inroute(s) can accommodate the user, repeat step 1.

8) If successful, move the potential user. Otherwise, else skip to step 12

9) increment the movement count of the single user selected for movement from the inroute.

10) Perform bandwidth accounting.

11) Accept the request for bandwidth growth.

12) If a potential user cannot be found successfully, pursue the next move option.

Moving Multiple Users

When moving a single user cannot successful accommodate the bandwidth growth, an attempt can be made to move multiple users. According to an embodiment, the following steps can be performed when attempting to select and move multiple users (e.g., up to three) from an inroute to another in order to accommodate a bandwidth growth request.

1) Select multiple potential users on the inroute where the requesting user resides.

2) Start with a potential user whose movement number has not exceeded the maximum and does not have AC-CBR sessions. If there are no terminals available on this inroute, choose available terminals with AC-CBR sessions if the number of moves has not exceeded the allowed maximum. When a terminal with AC-CBR sessions is selected, can only be moved to another inroute if the AC-CBR sessions can be fully accommodated. This may be repeated for other users.

3) At the minimum, verify if one of the following is met using the order below:

A) Ensure the sum of the guaranteed space left (LeftG) of the inroute and all the current bandwidth of the selected users is greater than or equal to the obliged required bandwidth or the current bandwidth of the requesting user, whichever is greater.

B) Ensure the sum of the inroute space left (LeftC) and all the current bandwidth of the selected users is greater than or equal to the obliged required bandwidth or the current bandwidth of the requesting user, which is greater.

4) If multiple potential users are selected, then verify that each of these users can be successfully accommodated in another inroute(s).

6) For each user, start with a least loaded inroute—this may need to be repeated 7) Ensure that the following are met:

A) inroute guaranteed space left (LeftG) is greater than or equal to the required obliged or current bandwidth of the potential user.

B) inroute space left (LeftC) is greater than or equal to the obliged bandwidth of the potential user or the current bandwidth of the potential user, whichever is greater.

8) If the user can't be accommodated, repeat step 6.

9) If none of the inroute(s) can accommodate any of the selected users, repeat step 2.

10) If successful, move each of the potential users. Otherwise, skip to step 15.

12) Set the "movement flag" that multiple users have been found for this purpose.

13) Perform bandwidth accounting.

14) Accept the bandwidth growth request.

15) If moving multiple-users does not successfully create the required space, log the rejection occurrence with the appropriate cause code and reject the bandwidth growth request.

Moving the Requesting User

If sufficient space is not obtainable by moving multiple users, the requesting user is moved only if its movement number has not exceeded the threshold, otherwise growth is rejected. The following steps can be performed to move the requesting user, according to at least one embodiment:

A) Start with a least loaded inroute—this may need to be repeated for all inroutes i) Ensure the guaranteed space left (LeftG) of the inroute is greater than or equal to the obliged or current bandwidth of the requesting user, whichever is greater or ii) Ensure the sum of the left space (LeftC) of the inroute is greater than or equal to the obliged or the current required bandwidth of the requesting user, whichever is greater.

B) If successful, increment the move count of the terminal.

C) Perform bandwidth accounting.

D) Assign the selected inroute to the requesting user.

E) Allocate the required bandwidth to the requesting user.

Figure 12:
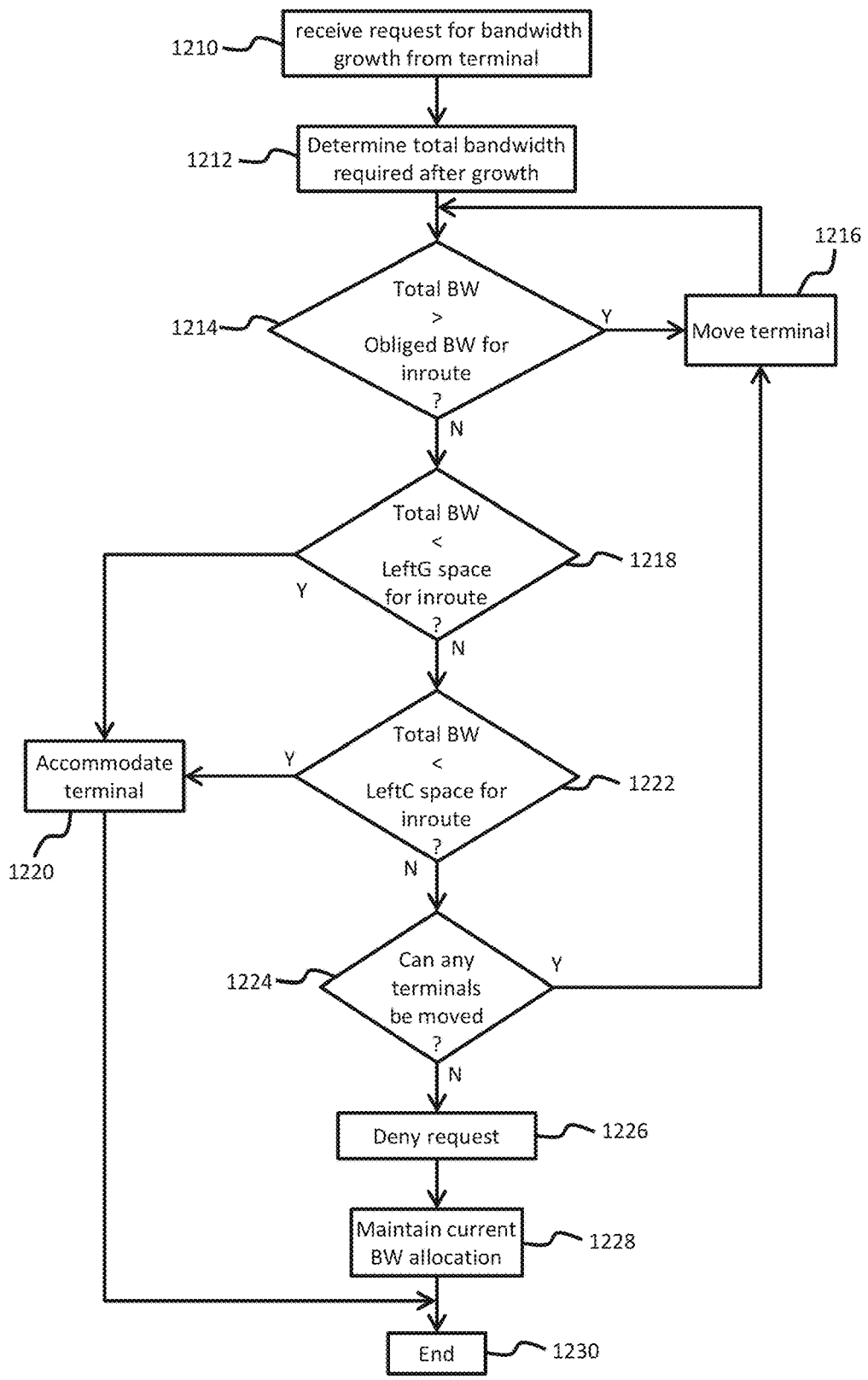
FIG. 12 is a flowchart of a process for accommodating bandwidth growth within an inroute, according to an embodiment.

FIG. 12 illustrates the steps performed in accommodating bandwidth growth in accordance to various embodiments. At 1210, a request is received from a terminal for bandwidth growth. More particularly, an existing terminal that is currently operating within a particular inroute would like to increase its current bandwidth allocation. At 1212, the total bandwidth required for the inroute after the bandwidth growth is determined. At 1214, it is determined whether the total bandwidth, after bandwidth growth, is greater than the obliged bandwidth for the inroute. If the total bandwidth (after bandwidth growth) is greater than the obliged bandwidth for the inroute, then control passes to 1216 one or more terminals are then moved from the inroute. Control returns to 1214 after the terminals have been moved.

If the total bandwidth required after growth is less than the obliged bandwidth for the inroute, then control passes to 1218. It is determined whether the total bandwidth required after growth is less than the LeftG space for the inroute. If the total bandwidth required is less than the LeftG space for the inroute, then control passes to 1220 where the requesting terminal is accommodated. More particularly, the requesting terminal would be granted the additional bandwidth it is requesting from the inroute. If the total bandwidth required after growth is not less than the LeftG space for the inroute, then control passes to 1222. It is determined if the total bandwidth is less than the LeftC space for the inroute. If the total bandwidth required after growth is less than the LeftC space, then the requesting terminal's request for bandwidth growth is accommodated at 1220. If the total bandwidth required after growth is not less than the LeftC space for the inroute, then control passes to 1224.

It is determined whether any terminals currently in the inroute can be moved to a different inroute. According to at least one embodiment, terminals that exceed a maximum number of moves and/or terminals that have not satisfied the required minimum residency within the inroute are not eligible for moving. If there are additional terminals that can be moved, control passes to 1216. One or more terminals are moved. Control then returns to 1214. If no terminals within the inroute can be moved, however, the requests for bandwidth growth is denied at 1226. At 1228, the current bandwidth allocation is maintained for the requesting terminal. The process subsequently ends at 1230.

Figure 13A:
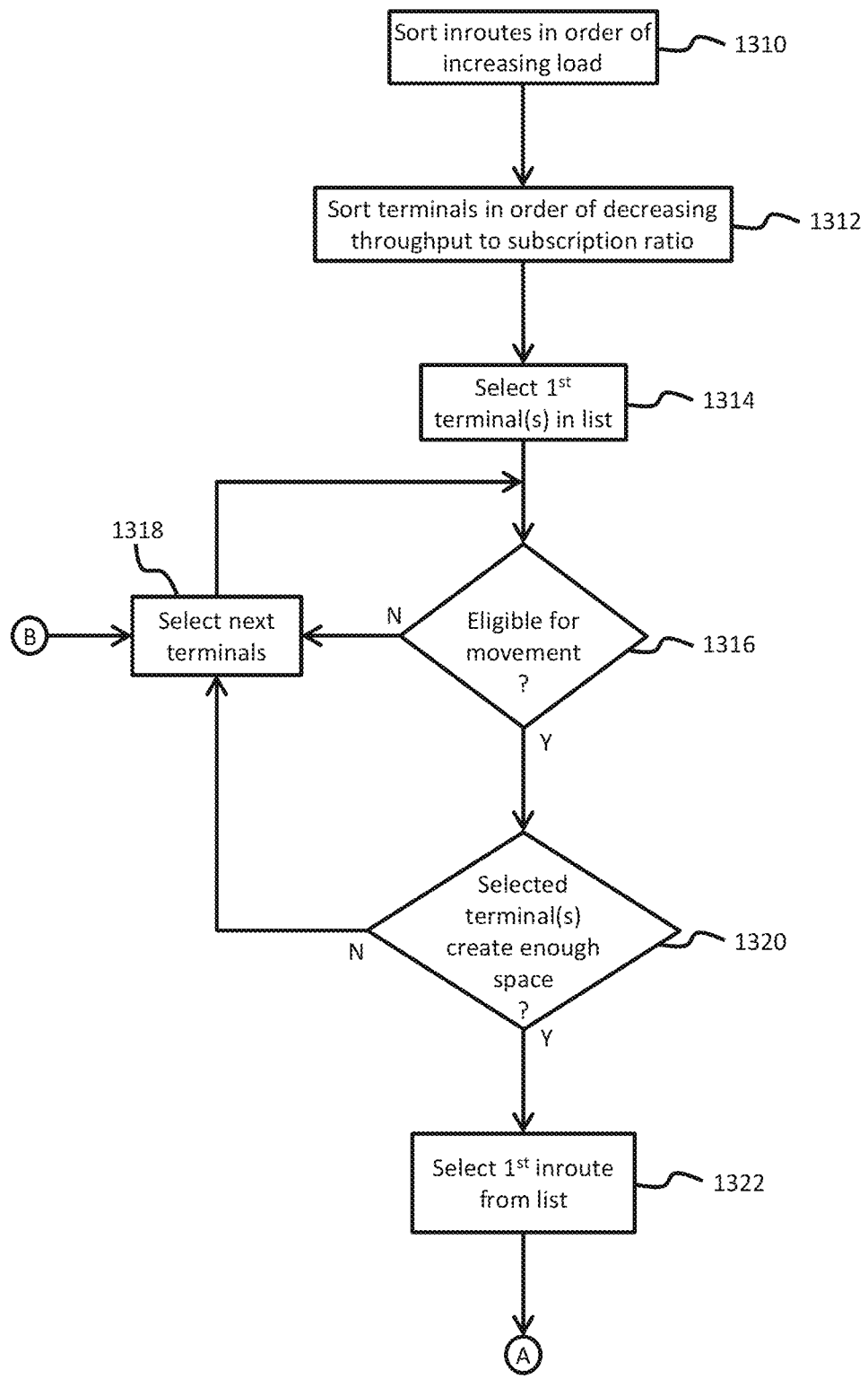
FIGS. 13A and 13B are a flowchart of a process moving terminals to accommodate bandwidth growth, according to one or more embodiments.
Figure 13B:
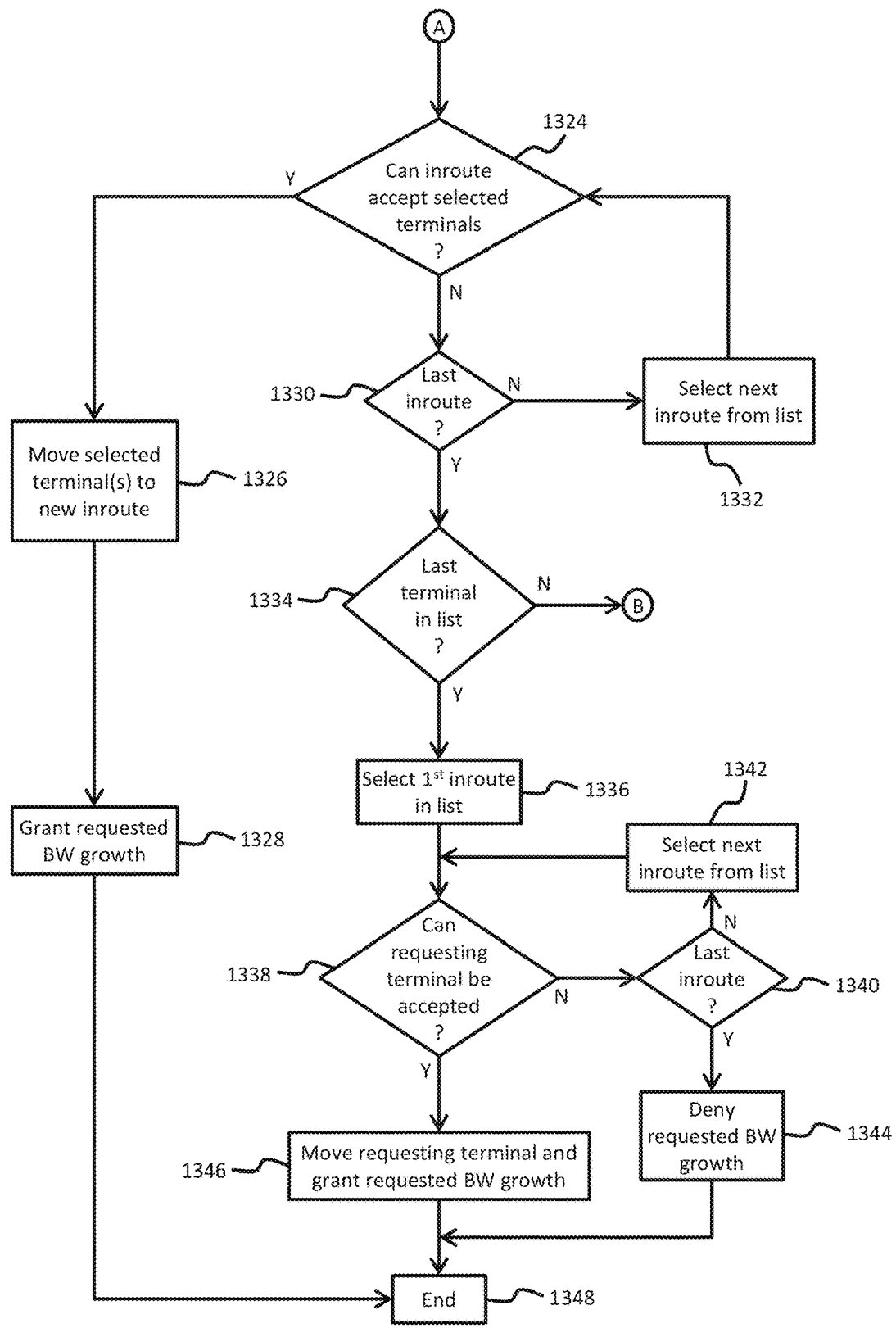

FIGS. 13A and 13B illustrate various steps performed for moving terminals from an inroute to accommodate bandwidth growth, in accordance with one or more embodiments. At 1310, the inroutes within the selected inroute group are sorted in order of increasing load. More particularly, all of the inroutes which belong in the same inroute group as the terminal requesting bandwidth growth are sorted in order of increasing load. At 1312, terminals within the inroute group are sorted in order of decreasing throughput to subscription ratio. At 1314, the first terminal in the list is selected. Depending on the types of attempts that have been made to move terminals from the inroute, multiple terminals can also be selected from the list. For example, an attempt would first be made to move a single terminal. If the bandwidth growth cannot be accommodated, then the steps are performed again using multiple terminals.

At 1316, it is determined whether the selected terminal (or terminals) is eligible for movement. If the selected terminals are not eligible for movement, then control passes to 1318 where the next terminal, or terminals, on the list are selected. If the selected terminal or terminals, however, are eligible for movement, then control passes to 1320. It is determined whether movement of the selected terminals would create enough space to accommodate the requested bandwidth growth. If movement of the terminals will not create sufficient space, then control passes to 1318 where additional terminals are selected from the list. If moving the selected terminals will create sufficient space to accommodate the requested bandwidth growth, then the first inroute from the list is selected at 1322.

At 1324, it is determined whether the selected inroute can accept the terminals that have been selected for movement from the current inroute. If the inroute can accept the selected terminals, then the selected terminals are moved to the new inroute at 1326. At 1328, the requested bandwidth growth is granted. If the new inroute cannot accept the selected terminals, however, control passes to 1330 where it is determined if this is the last inroute. If it is not the last inroute, then the next inroute from the list is selected at 1332. Control then returns to 1324. If it is determined that the current inroute is the last inroute, then control passes to 1334 where it is determined if the selected terminal is the last terminal from the list. If the selected terminal is not the last terminal, then control returns to 1318 where additional terminals are selected.

If the selected terminal is the last terminal from the list, then the first inroute from the list is selected at 1336. At 1338, it is determined whether the first inroute from the list can accept the terminal requesting the bandwidth growth. If the requesting terminal cannot be accepted, then at 1340 it is determined if this is the last inroute. If it is not the last inroute, then the next inroute from the list is selected at 1342. Control then returns to 1338. If the current inroute is not the last inroute in the list, then control passes to 1344 where the requested bandwidth growth is denied. Control would then pass to 1348 where the process ends. If it is determined at 1338 that the terminal requesting bandwidth growth can be accepted to the inroute, then control passes to 1346. The terminal requesting bandwidth growth is moved to the inroute and the bandwidth growth is granted. The process subsequently ends at 1348.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described inroute resource manager, CPU, computer, receivers, transmitters, transceivers, etc. Additionally, such hardware can be interfaced to connect and/or facilitate communication between different components such as the storage unit, the inroute resource manager, the CPU, etc.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation: single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 14:
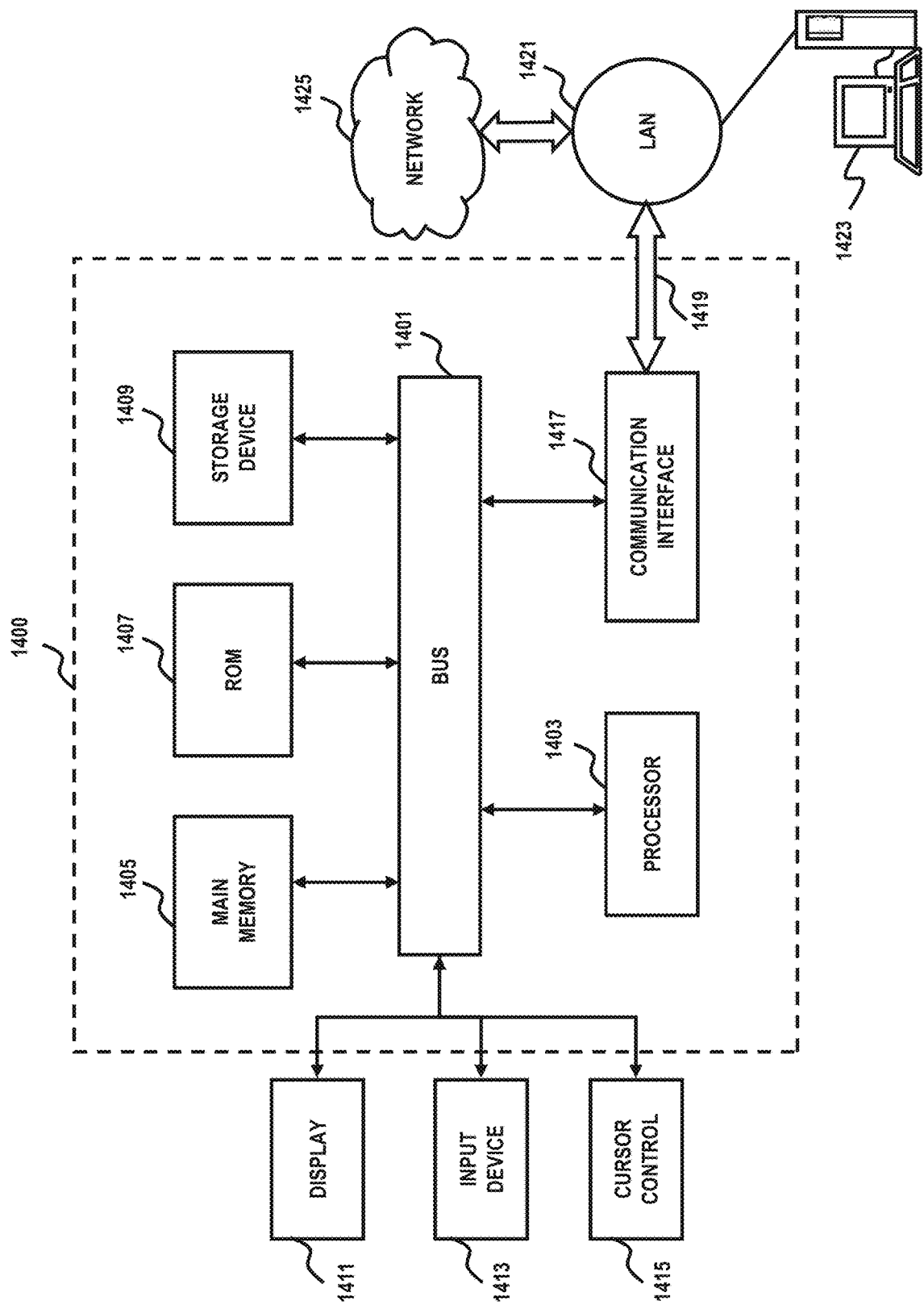
FIG. 14 is a diagram of a computer system that can be used to implement various exemplary features and embodiments.

FIG. 14 is a diagram of a computer system that can be used to implement features of various embodiments. The computer system 1400 includes a bus 1401 or other communication mechanism for communicating information and a processor 1403 coupled to the bus 1401 for processing information. The computer system 1400 also includes main memory 1405, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1401 for storing information and instructions to be executed by the processor 1403. Main memory 1405 can also be used for storing temporary variables or other intermediate information during execution of instructions by the processor 1403. The computer system 1400 may further include a read only memory (ROM) 1407 or other static storage device coupled to the bus 1401 for storing static information and instructions for the processor 1403. A storage device 1409, such as a magnetic disk or optical disk, is coupled to the bus 1401 for persistently storing information and instructions.

The computer system 1400 may be coupled via the bus 1401 to a display 1411, such as a light emitting diode (LED) or other flat panel displays, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for controlling cursor movement on the display 1411. Additionally, the display 1411 can be touch enabled (i.e., capacitive or resistive) in order facilitate user input via touch or gestures.

According to an exemplary embodiment, the processes described herein are performed by the computer system 1400, in response to the processor 1403 executing an arrangement of instructions contained in main memory 1405. Such instructions can be read into main memory 1405 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement exemplary embodiments. Thus, exemplary embodiments are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. For example, the communication interface 1417 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a High Definition Multimedia Interface (HDMI), etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 such as a wide area network (WAN) or the Internet. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network(s), the network link 1419, and the communication interface 1417. In the Internet example, a server (not shown) might transmit requested code belonging to an application program for implementing an exemplary embodiment through the network 1425, the local network 1421 and the communication interface 1417. The processor 1403 may execute the transmitted code while being received and/or store the code in the storage device 1409, or other non-volatile storage for later execution. In this manner, the computer system 1400 may obtain application code in the form of a carrier wave.

The term "computer-readable medium" as used herein refers to any medium that participates in providing instructions to the processor 1403 for execution. Such a medium may take many forms, including but not limited to non-volatile media, volatile media, and transmission media. Non-volatile media include, for example, optical or magnetic disks, such as the storage device 1409. Non-volatile media can further include flash drives, USB drives, microSD cards, etc. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

FIG. 15 illustrates a chip set 1500 upon which features of various embodiments may be implemented. Chip set 1500 is programmed to implement various features as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of the figures.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading.

The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1505 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   selecting an inroute set carrying traffic load in a satellite communication system based on a predetermined time interval;
   performing a super inroute group load balance between at least one super inroute group contained in the selected inroute set, each of the at least one super inroute group having a different symbol rate;
   performing an inroute group load balance between one or more inroute groups contained in each of the at least one super inroute group, each of the one or more inroute groups having a different modulation rate; and
   performing an inroute load balance between one or more inroutes contained in each of the one or more inroute groups,
   wherein the traffic load includes at least guaranteed service terminal traffic and/or backlog terminal traffic,
   wherein traffic load for the satellite communication system is balanced across the at least one super inroute group, the one or more inroute groups, and the one or more inroutes,
   wherein performing the super inroute group load balance comprises balancing a committed traffic load across the at least one super inroute group contained in the selected inroute set and balancing a backlog traffic load across the at least one super inroute group contained in the selected inroute set, and
   wherein balancing the committed traffic load comprises determining a mean committed service load density of the selected inroute set, determining a committed service load density of each super inroute group within the selected inroute set, and moving one or more guaranteed service terminals across the at least one super inroute group until the committed service load density of each super inroute group is within a predetermined tolerance of the mean committed service load density of the selected inroute set.

2. The method of claim 1, wherein the one or more guaranteed service terminals are moved based, at least in part, on a CQI and committed load of each guaranteed service terminal within the selected inroute set.

3. The method of claim 1, further comprising:
   determining a CQI for each guaranteed service terminal in the selected inroute set;
   setting a maximum number of allowed moves for guaranteed service terminals in the selected inroute set; and
   setting a minimum residency period for guaranteed service terminals in the selected inroute set,
   wherein the one or more guaranteed service terminals are moved across the at least one super inroute group based, at least in part, on the determined CQI, current number of moves, and current residency period.

4. The method of claim 3, wherein the maximum number of allowed moves is based, at least in part, on a predetermined time interval.

5. The method of claim 3, wherein moving one or more guaranteed service terminals comprises:
   sorting the guaranteed service terminals in the selected inroute set in a list arranged in descending order of CQI;
   selecting at least one guaranteed service terminal from the top of the list to be moved to an inroute group with a higher symbol rate, if the selected at least one guaranteed service terminal has a committed service load that is greater than or equal to the mean committed service load density for the selected inroute set; and
   selecting at least one guaranteed service terminal from the bottom of the list to be moved to an inroute group with a lower symbol rate, if the selected at least one guaranteed service terminal has a committed service load that is less than the mean committed service load density for the selected inroute set.

6. The method of claim 5, wherein guaranteed service terminals having admittance controlled constant bit rate (AC-CBR) sessions are excluded from the list, if their current number of moves exceed the maximum number of allowed moves and/or their current residency periods are below the minimum residency period.

7. The method of claim 1, wherein balancing the backlog traffic load comprises:
   determining a mean backlog load density for the selected inroute set;
   determining a backlog load density of each super inroute group within the selected inroute set; and
   moving one or more backlog terminals across different super inroute groups until the backlog load density of each super inroute group is within a predetermined tolerance of the mean backlog load density of the selected inroute set.

8. The method of claim 7, wherein the one or more backlog terminals are moved based, at least in part, on a CQI and backlog of each backlog terminal within the selected inroute set.

9. The method of claim 7, further comprising:
   determining a CQI for each backlog terminal in the selected inroute set; and
   setting a backlog volume threshold for the backlog terminals in the selected inroute set,
   wherein the one or more backlog terminals are moved across different super inroute groups based, at least in part, on the determined CQI and backlog volume threshold.

10. The method of claim 9, wherein the backlog volume threshold is determined based on values for a mean and standard deviation of backlog volume for the backlog terminals in the selected inroute set.

11. The method of claim 9, further comprising:
    sorting the backlog terminals in the selected inroute set in a list arranged in descending order of CQI;
    moving one or more backlog terminals from the top of the list to an inroute group with a higher symbol rate, if the one or more backlog terminals have a backlog that is greater than or equal to the backlog volume threshold; and
    moving one or more backlog terminals from the bottom of the list to an inroute group with a lower symbol rate, if the one or more backlog terminals have a backlog that is greater than or equal to the backlog volume threshold.

12. The method of claim 9, wherein backlog terminals having AC-CBR sessions are excluded from the list.

13. The method of claim 1, wherein performing the inroute group load balance comprises:
    balancing a committed traffic load across inroute groups contained in each of the at least one super inroute group; and
    balancing a backlog traffic load across inroute groups contained in each of the at least one super inroute group.

14. The method of claim 13, wherein balancing the committed traffic load comprises, for each super inroute group:
    determining a mean committed service load density for the super inroute group;
    determining a committed load density for each inroute group within the super inroute group;
    identifying a low inroute group having a lowest committed load density relative to the mean committed service load density of the super inroute group;
    identifying a high inroute group having a highest committed load density relative to the mean committed service load density of the super inroute group;
    moving one or more guaranteed service terminals between the low inroute group and the high inroute group until the committed load density of the low inroute group and the committed load density of the high inroute group are each within a predetermined tolerance of the mean committed service load density for the super inroute group; and
    repeating the steps of determining a committed load density, identifying a low inroute group, identifying a high inroute group, and moving one or more guaranteed service terminals, until the committed load densities of all inroute groups within the super inroute group are within the predetermined tolerance of the mean committed service load density for the super inroute group.

15. The method of claim 13, wherein balancing the backlog traffic load comprises, for each super inroute group:
    determining a mean backlog load density for the super inroute group;
    determining a backlog load density for each inroute group within the super inroute group;

identifying a low inroute group having a lowest backlog load density relative to the mean backlog load density of the super inroute group;

identifying a high inroute group having a highest backlog load density relative to the mean backlog load density of the super inroute group;

moving one or more backlog terminals between the low inroute group and the high inroute group until the backlog load density of the low inroute group and the backlog load density of the high inroute group are each within a predetermined tolerance of the mean backlog load density for the super inroute group; and repeating the steps of determining a backlog load density, identifying a low inroute group, identifying a high inroute group, and moving one or more backlog terminals, until the backlog load densities of all inroute groups within the super inroute group are within the predetermined tolerance of the mean backlog load density for the super inroute group.

16. The method of claim 1, wherein performing the inroute load balance comprises:

balancing committed traffic load across inroutes contained in each of the one or more inroute groups; and balancing backlog traffic load across inroutes contained in each of the one or more inroute groups.

17. The method of claim 16, wherein balancing the backlog traffic load comprises, for each inroute group:

determining a backlog-based centroid for the inroute group;

determining a backlog volume for each inroute within the inroute group;

selecting a low inroute having a lowest backlog volume relative to the centroid;

selecting a high inroute having a highest backlog volume relative to the centroid;

moving at least one backlog terminal between the low inroute and the high inroute until the backlog volume of the low inroute group and the backlog volume of the high inroute group are each within a predetermined tolerance of the centroid; and repeating the steps of determining a backlog volume, selecting a low inroute, selecting a high inroute, and moving at least one backlog terminal, until the backlog volumes of all inroutes within the inroute group are within the predetermined tolerance of the centroid.

* * * * *